(12) United States Patent
Liu et al.

(10) Patent No.: US 10,021,723 B2
(45) Date of Patent: Jul. 10, 2018

(54) RANDOM ACCESS METHOD AND SYSTEM

(71) Applicant: ZTE CORPORATION, Shenzhen, Guangdong Province (CN)

(72) Inventors: Kun Liu, Shenzhen (CN); Bo Dai, Shenzhen (CN); Shuqiang Xia, Shenzhen (CN); Zhaohua Lu, Shenzhen (CN); Huiying Fang, Shenzhen (CN); Jing Shi, Shenzhen (CN); Xincai Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 280 days.

(21) Appl. No.: 14/890,232

(22) PCT Filed: Mar. 17, 2014

(86) PCT No.: PCT/CN2014/000281
§ 371 (c)(1),
(2) Date: Nov. 10, 2015

(87) PCT Pub. No.: WO2014/180160
PCT Pub. Date: Nov. 13, 2014

(65) Prior Publication Data
US 2016/0088660 A1    Mar. 24, 2016

(30) Foreign Application Priority Data
May 10, 2013 (CN) .......................... 2013 1 0173558

(51) Int. Cl.
*H04W 74/08* (2009.01)
*H04L 5/00* (2006.01)
(Continued)

(52) U.S. Cl.
CPC ....... *H04W 74/0841* (2013.01); *H04L 1/1812* (2013.01); *H04L 5/00* (2013.01);
(Continued)

(58) Field of Classification Search
CPC ..... H04W 74/0841; H04L 1/1812; H04L 5/00
See application file for complete search history.

(56) References Cited

U.S. PATENT DOCUMENTS

2009/0213818 A1 * 8/2009 Park .................. H04W 74/0833
370/336
2010/0167768 A1    7/2010 Tsutsui
(Continued)

FOREIGN PATENT DOCUMENTS

CN     101489305 A    7/2009
CN     102740467 A    10/2012
(Continued)

OTHER PUBLICATIONS

3rd Generation Partnership Project; Technical Specification Group Radio Access Network; Evolved Universal Terrestrial Radio Access (E-UTRA); Medium Access Control (MAC) protocol specification; (Release 11). 3GPP TS 36.321 V11.2.0 (Mar. 2013).
(Continued)

*Primary Examiner* — Siming Liu
(74) *Attorney, Agent, or Firm* — Ling Wu; Stephen Yang; Ling and Yang Intellectual Property

(57) ABSTRACT

A random access method and system are disclosed. The method includes: a second node sending a random access signaling to a first node; and the first node replying a random access response message to the second node, wherein random access response information of the second node is carried in the random access response message.

27 Claims, 9 Drawing Sheets

```
A node 2 sends a random
access signaling to a node 1
            │
            ▼
The node 1 sends a random access
response message to the node 2, wherein,
random access response information
of the node 2 is carried in the random
access response message
```

(51) Int. Cl.
  *H04L 1/18* (2006.01)
  *H04W 24/08* (2009.01)
  *H04W 72/04* (2009.01)
  *H04W 84/18* (2009.01)

(52) U.S. Cl.
  CPC ............ *H04L 5/0005* (2013.01); *H04W 24/08* (2013.01); *H04W 72/0406* (2013.01); *H04W 74/08* (2013.01); *H04W 84/18* (2013.01)

(56) References Cited

U.S. PATENT DOCUMENTS

| | | | | |
|---|---|---|---|---|
| 2011/0249641 | A1* | 10/2011 | Kwon | H04W 74/0833 370/329 |
| 2012/0320842 | A1* | 12/2012 | Jeong | H04W 74/006 370/329 |
| 2013/0128798 | A1* | 5/2013 | Liu | H04W 48/12 370/312 |

FOREIGN PATENT DOCUMENTS

| | | |
|---|---|---|
| EP | 2536243 A1 | 12/2012 |
| JP | 2004260753 A | 9/2004 |
| JP | 2010536223 A | 10/2010 |
| JP | 2013017060 A | 1/2013 |

OTHER PUBLICATIONS

3GPP TSG RAN WG1 Meeting #67; San Francisco, USA, Nov. 14-18, 2011; Discussion to RAN2 LS on common search space for RACH on SCell; R1-113688.

3GPP TSG-RAN WG2#56; Nov. 6-10, 2006; Riga, Latvia; Qualcomm Europe; Random access procedure options.R2-063278.

* cited by examiner

RANDOM ACCESS METHOD AND SYSTEM

TECHNICAL FIELD

The present document relates to the field of communication, and particularly, to a random access method and system.

BACKGROUND OF THE RELATED ART

The Machine Type Communication (MTC) User Equipment (MTC UE) is also called a Machine-to-Machine (M2M) user communication equipment, which is a main application form of the Internet of things at the present stage. Low power consumption and low cost is an important guarantee for the MTC UE applied on a large scale. At present the M2M equipment deployed in the market is mainly based on a Global System of Mobile communication (GSM) system. In recent years, due to the improvement of spectrum efficiency of Long Term Evolution (LTE)/LTE-Advanced (LTE-A), more and more mobile operators select the LTE/LTE-A as an evolution direction of the future broadband wireless communication system. Multi-category M2M data services based on the LTE/LTE-A will also be more attractive. Only when it can make that the cost of the LTE-M2M equipment is lower than the cost of a MTC terminal of the GSM system, can M2M services be really switched to a LTE system from the GSM system.

At present, major alternative methods for reducing cost of the MTC user equipment include: reducing the number of receiving antennas of the terminal, reducing the baseband processing bandwidth of the terminal, reducing a peak rate supported by the terminal and using a half-duplex mode and so on. However, the cost reduction means the performance reduction, and the requirements for cell coverage of the LTE/LTE-A system cannot be reduced, thus an MTC terminal configured with low costs is required to take certain measures to achieve related coverage performance requirements of the LTE terminal. In addition, the MTC terminal may be located in places such as a basement and a corner and so on, the located scenarios are worse than that of a common LTE UE. In order to compensate the coverage reduction caused by the penetration loss, part of MTC UEs need higher performance improvement, thus, it is necessary to perform uplink and downlink coverage enhancement for part of MTC UEs with respect to this scenario. How to guarantee the user's access quality is a problem required to be firstly considered, and it is necessary to perform an enhanced design for a Physical Random Access Channel (PRACH) of the LTE/LTE-A system, to ensure that the MTC UE can access the system normally.

In the LTE/LTE-A system, location information of time-frequency resources occupied by a Random Access Response (RAR) message is contained in Downlink Control Information (DCI) and sent via a Physical Downlink Control Channel (PDCCH). Moreover, the above DCI information also includes a 16-bit Cyclic Redundancy Check (CRC), and the above CRC is scrambled with a 16-bit Random Access Radio Network Temporary Identity (RA-RNTI), and the scrambling mode is:

$$c_k = (b_k + a_k) \bmod 2 \quad k=0,1,L,15$$

wherein, $b_k$ is the k+1th bit in the CRC; $a_k$ is the k+1th bit in the RA-RNTI; and $c_k$ is the k+1th bit generated through scrambling.

Since the enhanced design has been performed on the Physical Random Access Channel (PRACH) of the LTE/LTE-A system to ensure that the MTC UE can access the system normally, it is also required to perform the enhanced design for the Random Access Response (RAR) message of the LTE/LTE-A system, to ensure that the MTC UE can receive the message normally.

SUMMARY OF THE INVENTION

The embodiments of the present invention provide a random access method and system, to improve the random access performance of the MTC UE.

The embodiment of the present invention provides a random access method, which comprises:

a second node sending a random access signaling to a first node; and the first node replying a random access response message to the second node, wherein random access response information of the second node is carried in the random access response message.

Alternatively, the random access response information comprises location information of uplink resources allocated by the first node to the second node.

Alternatively, the method further comprises:

after receiving the random access response message, according to the location information of the uplink resources allocated by the first node to the second node, the second node sending a conflict detection message in corresponding uplink resources.

Alternatively, the method further comprises:

after receiving the conflict detection message sent by the second node, the first node sending a conflict detection response message to the second node.

Alternatively, the random access signaling is generated by the second node in accordance with a preset rule according to selected random access information;

wherein, the random access information comprises at least one of the following:

the type of a random access sequence selected by the second node;

index information of a random access sequence selected by the second node; and information of the number of times of needing to repeatedly send the random access sequence.

Alternatively, the second node determines the number of times of needing to repeatedly send the random access sequence, which comprises:

the second node measuring a signal quality of a downlink reference signal sent by the first node, and comparing the signal quality of the downlink reference signal with a preset threshold value, and determining the number of times of needing to repeatedly send the random access sequence.

Alternatively, the preset threshold value comprises at least one value; wherein, a one-to-one mapping relationship exists between each value and the number of times of needing to repeatedly send one random access sequence.

Alternatively, the second node determines the number of times of needing to repeatedly send the random access sequence, which comprises:

the second node measuring a signal quality of a downlink reference signal sent by the first node, and comparing the signal quality of the downlink reference signal with a preset threshold value, and determining whether the random access sequence is required to be repeatedly sent.

Alternatively, if the second node determines that the random access sequence is required to be repeatedly sent, the number of times of needing to repeatedly send the random access sequence is configured by the second node or configured with standards.

Alternatively, the preset threshold value is configured with standards by default and stored in the second node; or the preset threshold value is configured with standards by default and stored in the first node, and is sent by the first node to the second node.

Alternatively, the downlink reference signal is at least one of the following: a cell-specific reference signal, a primary synchronization signal and a secondary synchronization signal.

Alternatively, information of the signal quality is at least one of the following: reference signal received power, a reference signal received quality, a received signal strength indicator, a path loss value between the second node and the first node, and a signal to noise ratio of the downlink reference signal.

Alternatively, the random access response message comprises a header and a payload, and the header comprises at least one subheader;

wherein, the index information of the random access sequence selected by the second node and/or the information of the number of times of repeatedly sending the random access sequence selected by the second node is sent in subheaders.

Alternatively, in at least parts of subheaders, there is a one-to-one correspondence between each subheader and one time-frequency resource block in the payload;

the random access response information containing the location information of the uplink resources allocated by the first node to the second node comprises:

in a time-frequency resource block corresponding to a subheader containing the information of the number of times of repeatedly sending the random access sequence selected by the second node and/or the index information of the random access sequence selected by the second node, containing the location information of the uplink resources allocated by the first node to the second node.

Alternatively, the random access response information containing the location information of the uplink resources allocated by the first node to the second node comprises:

the location information of the uplink resources allocated by the first node to the second node being in the payload, and a location in the payload being indicated by a subheader containing the index information of the random access sequence selected by the second node and/or the information of the number of times of repeatedly sending the random access sequence selected by the second node.

Alternatively, a location of the random access response information of the second node in the random access response message sent by the first node is sent to the second node through downlink control information or system information.

Alternatively, location information of resources occupied by the random access response message is preconfigured with standards and stored in the second node; or, the location information of the resources occupied by the random access response message is sent by the first node to the second node through downlink control information or system information.

Alternatively, the downlink control information further comprises an N-bit cyclic redundancy check (CRC);

wherein, N is a positive integer, and the CRC is scrambled with an N-bit random access radio network temporary identity (RA-RNTI).

Alternatively, the RA-RNTI is determined by at least one of the following:

resource information of a random access channel used by the second node;

random access information sent by the second node to the first node in the random access channel;

wherein, the resource information of the random access channel used by the second node comprises at least one of the following:

resource index information of the random access channel used by the second node;

index information of frames occupied by the random access channel used by the second node;

index information of subframes occupied by the random access channel used by the second node;

index information of frequency domain resources occupied by the random access channel used by the second node;

index information of physical resource blocks occupied by the random access channel used by the second node.

Alternatively, the location information of the resources occupied by the random access response message contains index information of time-frequency resource blocks occupied by the random access response message and/or indication information of time domain resources occupied by the random access response message.

Alternatively, the indication information of the time domain resources occupied comprises: indication information of frames and/or subframes occupied by the random access response message.

Alternatively, the method further comprises:

the first node sending information of the number of times of needing to repeatedly send the random access response message to the second node through downlink control information or system information.

Alternatively, the information of the number of times of needing to repeatedly send the random access response message is configured with standards or determined according to the random access information selected by the second node;

wherein, the random access information selected by the second node comprises: the type of a random access sequence selected by the second node, information of the number of times of needing to repeatedly send the random access sequence determined by the second node and/or index information of a random access sequence selected by the second node.

Alternatively, the downlink control information or system information further comprises a Hybrid Automatic Repeat Request (HARQ) mechanism enable identifier of the random access response message;

when the value of the HARQ mechanism enable identifier of the random access response message shows that an HARQ mechanism of the random access response message is enabled, it is to indicate to the second node that the random access response message is transmitted with the HARQ mechanism; and when the value of the HARQ mechanism enable identifier of the random access response message shows that an HARQ mechanism of the random access response message is disenabled, it is to indicate to the second node that a transmission mode used for the random access response message is configured with standards.

Alternatively, the subheader containing the index information of the random access sequence selected by the second node and/or the information of the number of times of repeatedly sending the random access sequence selected by the second node is scrambled with an RA-RNTI, and a scrambling mode is:

$$f_i=(d_i+e_i)\bmod 2\ i=0,1,L,M-1$$

wherein, $d_i$ is the i+1th bit in information bits of a subheader that is not scrambled; is the i+1th information bit in the RA-RNTI; $f_i$ is the i+1th bit in the subheader that is scrambled; and M is the number of bits in the subheader that is not scrambled.

Alternatively, a selection of M information bits in the RA-RNTI is configured with standards.

Alternatively, the location information of the uplink resources contains index information of time-frequency resource blocks occupied by the uplink resources and/or indication information of time domain resources occupied by the uplink resources.

Alternatively, the location information of the uplink resources is configured with standards or determined according to the random access information selected by the second node;

wherein, the random access information selected by the second node comprises: the type of a random access sequence selected by the second node, information of the number of times of needing to repeatedly send the random access sequence determined by the second node and/or index information of a random access sequence selected by the second node.

Alternatively, the index information of the time-frequency resource blocks occupied by the uplink resources is used for indicating index information of the uplink resources in P time-frequency resource blocks; wherein, P is a positive integer; the value of the P, the size of a time-frequency resource block and location distribution are configured with standards or determined according to the random access information selected by the second node;

wherein, the random access information selected by the second node comprises: the type of a random access sequence selected by the second node, information of the number of times of needing to repeatedly send the random access sequence determined by the second node and/or index information of a random access sequence selected by the second node.

Alternatively, the location information of the uplink resources further comprises information of the number of times of needing to repeatedly send the conflict detection information.

Alternatively, the method further comprises:

the first node sending location information of resources occupied by the conflict detection response message to the second node through the downlink control information or system information, wherein the location information of the resources is used for indicating the second node to receive the conflict detection response message in corresponding resource locations.

Alternatively, the location information of the resources occupied by the conflict detection response message comprises index information of time-frequency resource blocks occupied and/or indication information of time domain resources occupied.

Alternatively, the indication information of the time domain resources comprises indication information of frames and/or subframes.

Alternatively, information of the number of times of needing to repeatedly send the conflict detection response message is configured with standards or determined according to the random access information selected by the second node, or is sent through the downlink control information or system information;

wherein, the random access information selected by the second node comprises: the type of a random access sequence selected by the second node, information of the number of times of needing to repeatedly send the random access sequence determined by the second node and/or index information of a random access sequence selected by the second node.

Alternatively, the downlink control information or system information further comprises an HARQ mechanism enable identifier of the conflict detection response message;

when the value of the HARQ mechanism enable identifier of the random access response message shows that an HARQ mechanism of the random access response message is enabled, it is to indicate to the second node that the conflict detection response message is transmitted with the HARQ mechanism; and when the value of the HARQ mechanism enable identifier of the random access response message shows that an HARQ mechanism of the random access response message is disenabled, it is to indicate to the second node that a transmission mode used for the conflict detection response message is configured with standards.

Alternatively, the method further comprises:

after receiving the conflict detection response message, the second node replying an answering message of the conflict detection response message to the first node, wherein the answering message is used for confirming whether the second node successfully receives the conflict detection response message.

Alternatively, a resource location of the second node sending the answering message of the conflict detection response message is determined according to at least one of the following:

determined according to location indication information of resources of the answering message of the conflict detection response message allocated by the first node to the second node contained in the conflict detection response message;

determined according to the random access information selected by the second node;

determined according to the location information of the resources occupied by the conflict detection response message;

wherein, the random access information selected by the second node comprises: the type of a random access sequence selected by the second node, information of the number of times of needing to repeatedly send the random access sequence determined by the second node and/or index information of a random access sequence selected by the second node.

Alternatively, the first node is at least one of the following:

a Macrocell, a Microcell, a Picocell, a Femtocell (also called a home eNodeB), a low power node (LPN) and a Relay; and the second node is at least one terminal or is a terminal group.

Correspondingly, the embodiment of the present invention further provides a random access system, which comprises: a first node and a second node;

the second node is configured to send a random access signaling to the first node; and the first node is configured to reply a random access response message to the second node, wherein random access response information of the second node is carried in the random access response message.

Alternatively, the random access response information contains location information of uplink resources allocated by the first node to the second node.

Alternatively, after receiving the random access response message, according to the location information of the uplink resources allocated by the first node to the second node, the second node sends a conflict detection message in corresponding uplink resources.

Alternatively, the first node is further configured to: after receiving the conflict detection message sent by the second node, send a conflict detection response message to the second node.

Alternatively, the random access signaling is generated by the second node in accordance with a preset rule according to selected random access information;

wherein, the random access information comprises at least one of the following:

the type of a random access sequence selected by the second node;

index information of a random access sequence selected by the second node; and information of the number of times of needing to repeatedly send the random access sequence.

Alternatively, the second node determines the number of times of needing to repeatedly send the random access sequence by means of:

the second node being configured to: measure a signal quality of a downlink reference signal sent by the first node, and compare the signal quality of the downlink reference signal with a preset threshold value, and determine the number of times of needing to repeatedly send the random access sequence.

Alternatively, the preset threshold value comprises at least one value;

wherein, a one-to-one mapping relationship exists between each value and the number of times of needing to repeatedly send one random access sequence.

Alternatively, the second node determines the number of times of needing to repeatedly send the random access sequence by means of:

the second node being configured to: measure a signal quality of a downlink reference signal sent by the first node, and compare the signal quality of the downlink reference signal with a preset threshold value, and determine whether the random access sequence is required to be repeatedly sent.

Alternatively, if the second node determines that the random access sequence is required to be repeatedly sent, the number of times of needing to repeatedly send the random access sequence is configured by the second node or configured with standards.

Alternatively, the preset threshold value is configured with standards by default and stored in the second node; or the preset threshold value is configured with standards by default and stored in the first node, and is sent by the first node to the second node.

Alternatively, the downlink reference signal is at least one of the following: a cell-specific reference signal, a primary synchronization signal and a secondary synchronization signal.

Alternatively, information of the signal quality is at least one of the following: reference signal received power, a reference signal received quality, a received signal strength indicator, a path loss value between the second node and the first node, and a signal to noise ratio of the downlink reference signal.

Alternatively, the random access response message comprises a header and a payload, and the header comprises at least one subheader;

wherein, the index information of the random access sequence selected by the second node and/or the information of the number of times of repeatedly sending the random access sequence selected by the second node is sent in subheaders.

Alternatively, in at least parts of subheaders, there is a one-to-one correspondence between each subheader and one time-frequency resource block in the payload;

the random access response information containing the location information of the uplink resources allocated by the first node to the second node comprises:

in a time-frequency resource block corresponding to a subheader containing the information of the number of times of repeatedly sending the random access sequence selected by the second node and/or the index information of the random access sequence selected by the second node, containing the location information of the uplink resources allocated by the first node to the second node.

Alternatively, the random access response information containing the location information of the uplink resources allocated by the first node to the second node comprises:

the location information of the uplink resources allocated by the first node to the second node being in the payload, and a location in the payload being indicated by a subheader containing the index information of the random access sequence selected by the second node and/or the information of the number of times of repeatedly sending the random access sequence selected by the second node.

Alternatively, a location of the random access response information of the second node in the random access response message sent by the first node is sent to the second node through downlink control information or system information.

Alternatively, location information of resources occupied by the random access response message is preconfigured with standards and stored in the second node; or, the location information of the resources occupied by the random access response message is sent by the first node to the second node through downlink control information or system information.

Alternatively, the downlink control information further comprises a N-bit cyclic redundancy check (CRC);

wherein, N is a positive integer, the CRC is scrambled with a N-bit random access radio network temporary identity (RA-RNTI).

Alternatively, the RA-RNTI is determined by at least one of the following:

resource information of a random access channel used by the second node;

random access information sent by the second node to the first node in the random access channel;

wherein, the resource information of the random access channel used by the second node comprises at least one of the following:

resource index information of the random access channel used by the second node;

index information of frames occupied by the random access channel used by the second node;

index information of subframes occupied by the random access channel used by the second node;

index information of frequency domain resources occupied by the random access channel used by the second node;

index information of physical resource blocks occupied by the random access channel used by the second node.

Alternatively, the location information of the resources occupied by the random access response message contains index information of time-frequency resource blocks occupied by the random access response message and/or indication information of time domain resources occupied by the random access response message.

Alternatively, the indication information of the time domain resources occupied comprises: indication information of frames and/or subframes occupied by the random access response message.

Alternatively, the first node is further configured to send information of the number of times of needing to repeatedly send the random access response message to the second node through downlink control information or system information.

Alternatively, the information of the number of times of needing to repeatedly send the random access response message is configured with standards or determined according to the random access information selected by the second node;

wherein, the random access information selected by the second node comprises: the type of a random access sequence selected by the second node, information of the number of times of needing to repeatedly send the random access sequence determined by the second node and/or index information of a random access sequence selected by the second node.

Alternatively, the downlink control information or system information further comprises a Hybrid Automatic Repeat Request (HARQ) mechanism enable identifier of the random access response message;

when the value of the HARQ mechanism enable identifier of the random access response message shows that an HARQ mechanism of the random access response message is enabled, it is to indicate to the second node that the random access response message is transmitted with the HARQ mechanism; and when the value of the HARQ mechanism enable identifier of the random access response message shows that an HARQ mechanism of the random access response message is disenabled, it is to indicate to the second node that a transmission mode used for the random access response message is configured with standards.

Alternatively, the subheader containing the index information of the random access sequence selected by the second node and/or the information of the number of times of repeatedly sending the random access sequence selected by the second node is scrambled with an RA-RNTI, and a scrambling mode is:

$$f_i = (d_i + e_i) \bmod 2 \quad i = 0, 1, L, M-1$$

wherein, $d_i$ is the i+1th bit in information bits of a subheader that is not scrambled; $e_i$ is the i+1th information bit in the RA-RNTI; $f_i$ is the i+1th bit in the subheader that is scrambled; and M is the number of bits in the subheader that is not scrambled.

Alternatively, a selection of M information bits in the RA-RNTI is configured with standards.

Alternatively, the location information of the uplink resources contains index information of time-frequency resource blocks occupied by the uplink resources and/or indication information of time domain resources occupied by the uplink resources.

Alternatively, the location information of the uplink resources is configured with standards or determined according to the random access information selected by the second node;

wherein, the random access information selected by the second node comprises: the type of a random access sequence selected by the second node, information of the number of times of needing to repeatedly send the random access sequence determined by the second node and/or index information of a random access sequence selected by the second node.

Alternatively, the index information of the time-frequency resource blocks occupied by the uplink resources is used for indicating index information of the uplink resources in P time-frequency resource blocks; wherein, P is a positive integer; the value of the P, the size of a time-frequency resource block and location distribution are configured with standards or determined according to the random access information selected by the second node;

wherein, the random access information selected by the second node comprises: the type of a random access sequence selected by the second node, information of the number of times of needing to repeatedly send the random access sequence determined by the second node and/or index information of a random access sequence selected by the second node.

Alternatively, the location information of the uplink resources further comprises information of the number of times of needing to repeatedly send the conflict detection information.

Alternatively, the first node is further configured to send location information of resources occupied by the conflict detection response message to the second node through the downlink control information or system information, wherein the location information of the resources is used for indicating the second node to receive the conflict detection response message in corresponding resource locations.

Alternatively, the location information of the resources occupied by the conflict detection response message comprises index information of time-frequency resource blocks occupied and/or indication information of time domain resources occupied.

Alternatively, the indication information of the time domain resources comprises indication information of frames and/or subframes.

Alternatively, information of the number of times of needing to repeatedly send the conflict detection response message is configured with standards or determined according to the random access information selected by the second node, or is sent through the downlink control information or system information;

wherein, the random access information selected by the second node comprises: the type of a random access sequence selected by the second node, information of the number of times of needing to repeatedly send the random access sequence determined by the second node and/or index information of a random access sequence selected by the second node.

Alternatively, the downlink control information or system information further comprises an HARQ mechanism enable identifier of the conflict detection response message;

when the value of the HARQ mechanism enable identifier of the random access response message shows that an HARQ mechanism of the random access response message is enabled, it is to indicate to the second node that the conflict detection response message is transmitted with the HARQ mechanism; and when the value of the HARQ mechanism enable identifier of the random access response message shows that an HARQ mechanism of the random access response message is disenabled, it is to indicate to the second node that a transmission mode used for the conflict detection response message is configured with standards.

Alternatively, the second node is further configured to: after receiving the conflict detection response message, reply an answering message of the conflict detection response message to the first node, wherein the answering message is used for confirming whether the second node successfully receives the conflict detection response message.

Alternatively, a resource location of the second node sending the answering message of the conflict detection response message is determined according to at least one of the following:

determined according to location indication information of resources of the answering message of the conflict detection response message allocated by the first node to the second node contained in the conflict detection response message;

determined according to the random access information selected by the second node;

determined according to the location information of the resources occupied by the conflict detection response message;

wherein, the random access information selected by the second node comprises: the type of a random access sequence selected by the second node, information of the number of times of needing to repeatedly send the random access sequence determined by the second node and/or index information of a random access sequence selected by the second node.

Alternatively, the first node is at least one of the following:

a Macrocell, a Microcell, a Picocell, a Femtocell (also called a home eNodeB), a low power node (LPN) and a Relay; and the second node is at least one terminal or is a terminal group.

In the embodiments of the present invention, it enables the MTC UE to normally access the system, and decreases a random access collision probability, and reduces the access delay.

PREFERRED EMBODIMENTS OF THE INVENTION

The embodiments of the present invention will be described in detail in combination with the accompanying drawings below. It should be noted that the embodiments in the present invention and the characteristics in the embodiments can be optionally combined with each other in the condition of no conflict.

Figure 1:
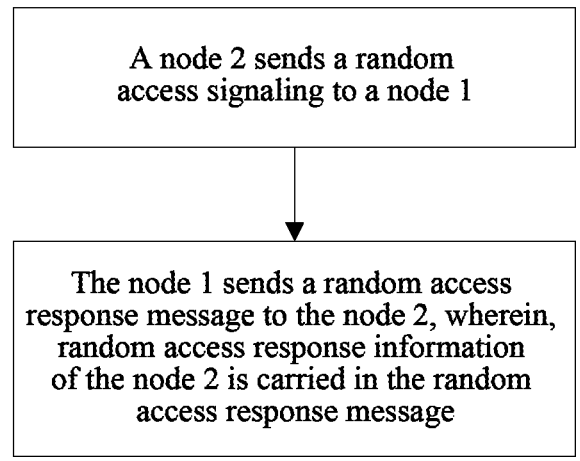
FIG. 1 is a flow chart of a random access method in the embodiment of the present invention.

The embodiment provides a random access method, and as shown in FIG. 1, it includes:

(1) A node 2 sending a random access signaling to a node 1; and (2) The node 1 replying a random access response message to the node 2, wherein random access response information of the node 2 is carried in the random access response message; the random access response message is used for responding to the random access signaling sent by the node 2 to the node 1 in a random access channel; wherein location information of uplink resources allocated by the node 1 to the node 2 is contained in the random access response message;

wherein, the node 1 can be at least one of the following:
a Macrocell, a Microcell, a Picocell, a Femtocell (also called a home eNodeB), a Low Power Node (LPN) (also can be called as a Smallcell) and a Relay;

wherein, the node 2 can be at least one of the following:
at least one terminal;
a group of terminals;

wherein, the random access signaling is generated by the node 2 in accordance with a preset rule according to selected random access information.

Alternatively, the random access information contains at least one of the following:
the type of a random access sequence selected by the node 2;
index information of a random access sequence selected by the node 2; and
information of the number of times of needing to repeatedly send a random access sequence selected by the node 2.

Alternatively, the information of the number of times of needing to repeatedly send the random access sequence selected by the node 2 is determined with the following method:
the node 2 measuring the signal quality information of a downlink reference signal sent by the node 1, and comparing the signal quality information of the downlink reference signal with a preset threshold value, and determining the number of times of needing to repeatedly send the random access sequence; wherein, the preset threshold value includes at least one value, and a one-to-one mapping relationship exists between each value and the number of times of needing to repeatedly send one random access sequence.

For example, 4 predetermined threshold values Th-A, Th-B, Th-C and Th-D have been known, and Th-A<Th-B<Th-C<Th-D is satisfied, which respectively corresponds to repeatedly sending the random access sequence for 5 times, 10 times, 50 times and 100 times;

when the node 2 measures that the signal quality information Q of the downlink reference signal sent by the node 1 satisfies Q<Th-A, the random access sequence selected by the node 2 is required to be sent once;

when the node 2 measures that the signal quality information Q of the downlink reference signal sent by the node 1 satisfies Th-A≤Q<Th-B, the random access sequence selected by the node 2 is required to be sent for 5 times;

when the node 2 measures that the signal quality information Q of the downlink reference signal sent by the node 1 satisfies Th-B≤Q<Th-C, the random access sequence selected by the node 2 is required to be sent for 10 times;

when the terminal measures that the signal quality information Q of the downlink reference signal sent by the base station satisfies Th-C≤Q<Th-D, the random access sequence selected by the node 2 is required to be sent for 50 times;

when the terminal measures that the signal quality information Q of the downlink reference signal sent by the base station satisfies Q≥Th-D, the random access sequence selected by the node 2 is required to be sent for 100 times;

the node 2 also can determine the number of times of needing to repeatedly send the random access sequence by means of:
the node 2 measuring a signal quality of a downlink reference signal sent by the node 1, and comparing the signal quality of the downlink reference signal with a preset threshold value, and determining whether the random access sequence is required to be repeatedly sent. If it is determined that the random access sequence is required to be repeatedly sent, the number of times of needing to repeatedly send the random access sequence is configured by the node 2 or configured with standards.

Alternatively, the downlink reference signal can be at least one of the following:
a Cell-specific reference signal (CRS),
a Primary Synchronization Signal (PSS), and
a Secondary Synchronization Signal (SSS).

Alternatively, the signal quality information can be at least one of the following:
Reference Signal Received Power (RSRP);
a Reference Signal Received Quality (RSRQ);
a Received Signal Strength Indicator (RSSI);
a path loss value between the node 2 and the node 1; and
a signal to noise ratio.

Alternatively, the preset threshold value can be configured with standards by default and stored in the node 2; or the preset threshold value is configured with standards by default and stored in the node 1, and is sent by the node 1 to the node 2;

wherein, location information of resources occupied by the random access response message is preconfigured with standards and stored in the node 1 and node 2;

wherein, the location information of the resources occupied by the random access response message is sent by the node 1 to the node 2 through downlink control information or system information.

Alternatively, the node 1 sends the downlink control information or system information by means of unicast, multicast or broadcast.

Alternatively, the downlink control information also includes a N-bit CRC.

Alternatively, the CRC is scrambled with a N-bit RA-RNTI.

Alternatively, the RA-RNTI is determined by at least one of the following:
resource information of a random access channel used by the node 2;
the random access information sent by the node 2 to the node 1 via the random access channel.

Alternatively, the resource information of the random access channel used by the node 2 includes at least one of the following:
resource index information of the random access channel used by the node 2;
index information of frames occupied by the random access channel used by the node 2;
index information of subframes occupied by the random access channel used by the node 2;
index information of frequency domain resources occupied by the random access channel used by the node 2;
index information of Physical Resource Blocks (PRBs) occupied by the random access channel used by the node 2.

Alternatively, the location information of the resources occupied by the random access response message contains index information of time-frequency resource blocks occupied and/or indication information of time domain resources occupied.

Alternatively, the indication information of the time domain resources refers to indication information of frames and/or subframes.

Alternatively, information of the number of times of needing to repeatedly send the random access response message can be sent through downlink control information or system information.

Alternatively, the information of the number of times of needing to repeatedly send the random access response message is configured with standards or determined according to the random access information selected by the node 2.

Alternatively, the downlink control information or system information also can include a Hybrid Automatic Repeat Request (HARQ) mechanism enable identifier of the random access response message;

when the value of the HARQ mechanism enable identifier of the random access response message shows that an HARQ mechanism of the random access response message is enabled, the random access response message is transmitted with the HARQ mechanism; and when the value of the HARQ mechanism enable identifier of the random access response message shows that an HARQ mechanism of the random access response message is disenabled, a transmission mode used for the random access response message is configured with standards;

the location information of the random access response information of the node 2 in the random access response message sent by the node 1 is indicated by the downlink control information or system information, and it also can be configured with standards;

wherein, the random access response message is composed of a header and a Payload;

wherein, the header includes at least one subheader;

wherein, the subheader includes the index information of the random access sequence selected by the node 2 and/or the information of the number of repeating times; in at least parts of subheaders, there is a one-to-one correspondence between each subheader and one time-frequency resource block in the payload; and in a time-frequency resource block corresponding to a subheader containing the information of the number of times of repeatedly sending the random access sequence selected by the node 2 and/or the index information of the random access sequence selected by the node 2, the location information of the uplink resources allocated by the node 1 to the node 2 can be contained;

wherein, the subheader can be scrambled with an RA-RNTI.

Alternatively, the scrambling mode is:

$f_i = (d_i + e_i) \bmod 2 \ \ i=0,1,L,M-1$ wherein, $d_i$ is the i+1th bit in information bits of a subheader that is not scrambled; $e_i$ is the i+1th information bit in the RA-RNTI; $f_i$ is the i+1th information bit in a subheader that is scrambled; and M is the number of information bits of the subheader that is not scrambled.

Alternatively, a selection of M information bits in the RA-RNTI is configured with standards;

wherein, the payload includes the location information of the uplink resources allocated by the node 1 to the node 2; and a location in the payload is indicated by a subheader containing the index information of the random access sequence selected by the node 2 and/or the information of the number of times of repeatedly sending the random access sequence selected by the node 2.

Alternatively, the node 2 can send a conflict detection message in the uplink resources.

Alternatively, the location information of the uplink resources contains index information of time-frequency resource blocks occupied by the uplink resources and/or indication information of time domain resources occupied by the uplink resources; and it also can include the number of times of needing to repeatedly send the conflict detection information.

Alternatively, the indication information of the time domain resources occupied by the uplink resources refers to indication information of frames and/or subframes occupied by the uplink resources.

Alternatively, the location information of the uplink resources is configured with standards or determined according to the random access information selected by the node 2.

Alternatively, the index information of the time-frequency resource blocks occupied by the uplink resources is used for indicating index information of the uplink resources in P (P>=1) time-frequency resource blocks.

More alternatively, the value of P, the size of a time-frequency resource block and location distribution are configured with standards or determined according to the random access information selected by the node 2.

(3) When the node 2 successfully receives the random access response message sent by the node 1, the node 2 sends a conflict detection message in the uplink resources allocated by the node 1 to the node 2;

(4) After receiving the conflict detection message sent by the node 2, the node 1 sends a conflict detection response message to the node 2.

Wherein, location information of resources occupied by the conflict detection response message is sent by the node 1 to the node 2 through the downlink control information or system information.

Alternatively, the node 1 sends the downlink control information or system information by means of unicast, multicast or broadcast.

Alternatively, the location information of the resources occupied by the conflict detection response message contains index information of time-frequency resource blocks occupied and/or indication information of time domain resources occupied.

Alternatively, the indication information of the time domain resources refers to indication information of frames and/or subframes.

Alternatively, information of the number of times of needing to repeatedly send the conflict detection response message can be sent through the downlink control information or system information.

Alternatively, the information of the number of times of needing to repeatedly send the conflict detection response message is configured with standards or determined according to the random access information selected by the node 2; alternatively, the downlink control information or system information also can include an HARQ mechanism enable identifier of the conflict detection response message; wherein, the location indication information of resources of the node 2 sending an answering message of the conflict detection response message is obtained by at least one of the following:

the conflict detection response message containing location indication information of resources of the answering message of the conflict detection response message allocated by the node 1 to the node 2;

determining according to the random access information selected by the node 2;

the location information of the resources occupied by the conflict detection response message.

Alternatively, the answering message is used for confirming whether the node 2 successfully receives the conflict detection response message.

Figure 12:
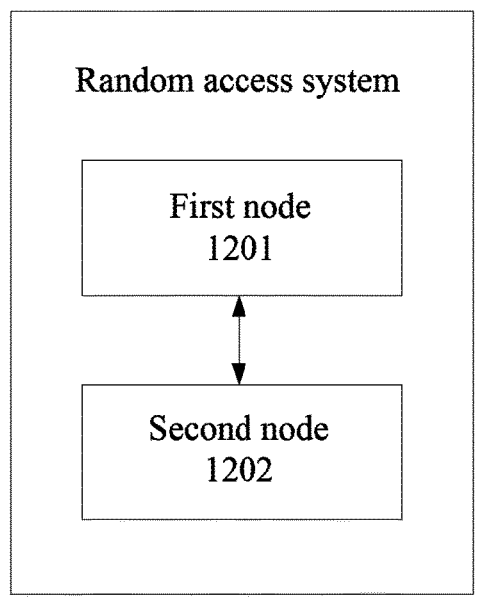
FIG. 12 is a schematic diagram of a structure of a random access system in the embodiment of the present invention.

Moreover, in the embodiment, a random access system includes a first node 1201 and a second node 1202, as shown in FIG. 12;

the second node 1202 is configured to send a random access signaling to the first node; and the first node 1201 is configured to reply a random access response message to the second node, wherein random access response information of the second node is carried in the random access response message.

Preferably, the random access response information contains location information of uplink resources allocated by the first node 1201 to the second node 1202.

Preferably, after receiving the random access response message, according to the location information of the uplink resources allocated by the first node 1201 to the second node 1202, the second node 1202 sends a conflict detection message in corresponding uplink resources.

Preferably, the first node 1201 is further configured to: after receiving the conflict detection message sent by the second node 1202, send a conflict detection response message to the second node.

Preferably, the random access signaling is generated by the second node 1202 in accordance with a preset rule according to selected random access information;

wherein, the random access information contains at least one of the following: the type of a random access sequence selected by the second node 1202;

index information of a random access sequence selected by the second node 1202; and information of the number of times of needing to repeatedly send the random access sequence.

Preferably, the second node 1202 is configured to determine the number of times of needing to repeatedly send the random access sequence by means of:

the second node 1202 being configured to: measure a signal quality of a downlink reference signal sent by the first node, and compare the signal quality of the downlink reference signal with a preset threshold value, and determine the number of times of needing to repeatedly send the random access sequence.

Preferably, the preset threshold value includes at least one value;

wherein, a one-to-one mapping relationship exists between each value and the number of times of needing to repeatedly send one random access sequence.

Preferably, the second node 1202 is configured to determine the number of times of needing to repeatedly send the random access sequence by means of:

the second node 1202 being configured to: measure a signal quality of a downlink reference signal sent by the first node 1201, and compare the signal quality of the downlink reference signal with a preset threshold value, and determine whether the random access sequence is required to be repeatedly sent.

Preferably, if it is determined that the random access sequence is required to be repeatedly sent, the number of times of needing to repeatedly send the random access sequence is configured by the second node 1202 or configured with standards.

Preferably, the preset threshold value is configured with standards by default and stored in the second node 1202; or the preset threshold value is configured with standards by default and stored in the first node 1201, and is sent by the first node 1201 to the second node 1202.

Preferably, the downlink reference signal is at least one of the following: a cell-specific reference signal, a primary synchronization signal and a secondary synchronization signal.

Preferably, the signal quality information is at least one of the following: reference signal received power, a reference signal received quality, a received signal strength indicator, a path loss value between the second node 1202 and the first node 1201, and a signal to noise ratio of the downlink reference signal.

Preferably, the random access response message comprises a header and a payload, and the header comprises at least one subheader;

wherein, the index information of the random access sequence selected by the second node and/or the information of the number of times of repeatedly sending the random access sequence selected by the second node 1202 is sent in subheaders.

Preferably, in at least parts of subheaders, there is a one-to-one correspondence between each subheader and one time-frequency resource block in the payload;

the random access response information containing the location information of the uplink resources allocated by the first node 1201 to the second node 1202 includes:

in a time-frequency resource block corresponding to a subheader containing the information of the number of times of repeatedly sending the random access sequence selected by the second node 1202 and/or the index information of the random access sequence selected by the second node 1202, containing the location information of the uplink resources allocated by the first node 1201 to the second node 1202.

Preferably, the random access response information containing the location information of the uplink resources allocated by the first node 1201 to the second node 1202 includes:

the location information of the uplink resources allocated by the first node 1201 to the second node 1202 being in the payload, and a location in the payload being indicated by a subheader containing the index information of the random access sequence selected by the second node 1202 and/or the information of the number of times of repeatedly sending the random access sequence selected by the second node 1202.

Preferably, a location of the random access response information of the second node 1202 in the random access response message sent by the first node 1201 is sent to the second node 1202 through downlink control information or system information.

Preferably, location information of resources occupied by the random access response message is preconfigured with standards and stored in the second node 1202; or, the location information of the resources occupied by the random access response message is sent by the first node 1201 to the second node 1202 through downlink control information or system information.

Preferably, the downlink control information also includes a N-bit cyclic redundancy check (CRC);

wherein, N is a positive integer, the CRC is scrambled with a N-bit random access radio network temporary identity (RA-RNTI).

Preferably, the RA-RNTI is determined by at least one of the following:

resource information of a random access channel used by the second node 1202;

random access information sent by the second node 1202 to the first node 1201 via the random access channel;

wherein, the resource information of the random access channel used by the second node 1202 includes at least one of the following:

resource index information of the random access channel used by the second node 1202; index information of frames occupied by the random access channel used by the second node 1202;

index information of subframes occupied by the random access channel used by the second node 1202;

index information of frequency domain resources occupied by the random access channel used by the second node 1202;

index information of physical resource blocks occupied by the random access channel used by the second node 1202.

Preferably, the location information of the resources occupied by the random access response message contains index information of time-frequency resource blocks occupied by the random access response message and/or indication information of time domain resources occupied by the random access response message.

Preferably, the indication information of the time domain resources occupied comprises: indication information of frames and/or subframes occupied by the random access response message.

Preferably, the first node 1201 is further configured to send information of the number of times of needing to repeatedly send the random access response message to the second node 1202 through downlink control information or system information.

Preferably, the information of the number of times of needing to repeatedly send the random access response message is configured with standards or determined according to the random access information selected by the second node 1202;

wherein, the random access information selected by the second node 1202 includes: the type of a random access sequence selected by the second node 1202, information of the number of times of needing to repeatedly send the random access sequence determined by the second node 1202 and/or index information of a random access sequence selected by the second node 1202.

Preferably, the downlink control information or system information also includes a Hybrid Automatic Repeat Request (HARQ) mechanism enable identifier of the random access response message;

when the value of the HARQ mechanism enable identifier of the random access response message shows that an HARQ mechanism of the random access response message is enabled, it is to indicate to the second node 1202 that the random access response message is transmitted with the HARQ mechanism; and when the value of the HARQ mechanism enable identifier of the random access response message shows that an HARQ mechanism of the random access response message is disenabled, it is to indicate to the second node 1202 that a transmission mode used for the random access response message is configured with standards.

Preferably, the subheader containing the index information of the random access sequence selected by the second node 1202 and/or the information of the number of times of repeatedly sending the random access sequence selected by the second node is scrambled with a RA-RNTI, and a scrambling mode is:

$$f_i=(d_i+e_i) \bmod 2 \; i=0,1,L,M-1$$

wherein, $d_i$ is the i+1th bit in information bits of a subheader that is not scrambled; $e_i$ is the i+1th information bit in the RA-RNTI; $f_i$ is the i+1th bit in a subheader that is scrambled; and M is the number of bits in the subheader that is not scrambled.

Preferably, a selection of M information bits in the RA-RNTI is configured with standards.

Preferably, the location information of the uplink resources contains index information of time-frequency resource blocks occupied by the uplink resources and/or indication information of time domain resources occupied by the uplink resources.

Preferably, the location information of the uplink resources is configured with standards or determined according to the random access information selected by the second node 1202;

wherein, the random access information selected by the second node 1202 includes: the type of a random access sequence selected by the second node 1202, information of the number of times of needing to repeatedly send the random access sequence determined by the second node 1202 and/or index information of a random access sequence selected by the second node 1202.

Preferably, the index information of time-frequency resource blocks occupied by the uplink resources is used for indicating index information of the uplink resources in P time-frequency resource blocks; wherein, P is a positive integer; the value of the P, the size of a time-frequency resource block and location distribution are configured with standards or determined according to the random access information selected by the second node 1202;

wherein, the random access information selected by the second node 1202 includes: the type of a random access sequence selected by the second node 1202, information of the number of times of needing to repeatedly send the random access sequence determined by the second node 1202 and/or index information of a random access sequence selected by the second node 1202.

Preferably, the location information of the uplink resources also includes information of the number of times of needing to repeatedly send the conflict detection information.

Preferably, the first node 1201 is further configured to: send location information of resources occupied by the conflict detection response message to the second node 1202 through the downlink control information or system information, wherein the location information of the resources is used for instructing the second node 1202 to receive the conflict detection response message in corresponding resource locations.

Preferably, the location information of the resources occupied by the conflict detection response message includes index information of time-frequency resource blocks occupied and/or indication information of time domain resources occupied.

Preferably, the indication information of the time domain resources includes indication information of frames and/or subframes.

Preferably, information of the number of times of needing to repeatedly send the conflict detection response message is configured with standards or determined according to the random access information selected by the second node 1202, or is sent in the downlink control information or system information;

wherein, the random access information selected by the second node 1202 includes: the type of a random access sequence selected by the second node, information of the number of times of needing to repeatedly send the random access sequence determined by the second node 1202 and/or index information of a random access sequence selected by the second node 1202.

Preferably, the downlink control information or system information also includes a HARQ mechanism enable identifier of the conflict detection response message;

when the value of the HARQ mechanism enable identifier of the random access response message shows that an HARQ mechanism of the random access response message is enabled, it is to indicate to the second node 1202 that the conflict detection response message is transmitted with the HARQ mechanism; and when the value of the HARQ mechanism enable identifier of the random access response message shows that a HARQ mechanism of the random access response message is disenabled, it is to indicate to the second node 1202 that a transmission mode used for the conflict detection response message is configured with standards.

Preferably, the second node 1202 is further configured to: after receiving the conflict detection response message, reply an answering message of the conflict detection response message to the first node, wherein the answering message is used for confirming whether the second node 1202 successfully receives the conflict detection response message.

Preferably, a resource location of the second node 1202 sending the answering message of the conflict detection response message is determined according to at least one of the following:

determined according to location indication information of resources of the answering message of the conflict detection response message allocated by the first node 1201 to the second node 1202 contained in the conflict detection response message;

determined according to the random access information selected by the second node 1202;

determined according to the location information of the resources occupied by the conflict detection response message;

wherein, the random access information selected by the second node 1202 includes: the type of a random access sequence selected by the second node 1202, information of the number of times of needing to repeatedly send the random access sequence determined by the second node 1202 and/or index information of a random access sequence selected by the second node 1202.

Preferably, the first node 1201 is at least one of the following:

a Macrocell, a Microcell, a Picocell, a Femtocell (also called a home eNodeB), a low power node (LPN) and a Relay;

the second node is at least one terminal or is a terminal group.

The embodiments of the present invention will be described in detail with a plurality of application examples below. It should be noted that it is to uniformly use an eNodeB to represent the node 1 and use a User Equipment (UE) to represent the node 2 for a convenient description below.

APPLICATION EXAMPLE 1

In a wireless communication system, a random access method includes the following steps.

(1) A terminal UE1 in the wireless communication system sends a random access signaling in a random access channel, and the random access signaling can be constituted in the following ways.

(a) Firstly, the UE1 determines the number of times of needing to repeatedly send a random access sequence, which includes:

the UE1 measuring the signal quality information of a downlink reference signal sent by the eNodeB, and comparing the signal quality information of the downlink reference signal with a preset threshold value, and determining the number of times of needing to repeatedly send the random access sequence;

wherein, the above downlink reference signal can be at least one of the following:

a cell-specific reference signal, a primary synchronization signal and a secondary synchronization signal;

the signal quality information can be at least one of the following:

reference signal received power, a reference signal received quality, a received signal strength indicator, a path loss value between the UE1 and the eNodeB, and a signal to noise ratio of the downlink reference signal;

the preset threshold value can be configured with standards by default and stored in the UE1, or it can be configured with standards by default and stored in the eNodeB, and then be sent by the eNodeB to the UE1;

the preset threshold value includes at least one value;

wherein, the eNodeB can be one of the following:

a Macrocell, a Microcell, a Picocell, a Femtocell (also called a home eNode B) and a Smallcell.

In the example, the scheme of the UE1 determining the number of times of needing to repeatedly send the random access sequence is described as follows.

For example, Th-A, Th-B, Th-C and Th-D are 4 predetermined threshold values, and Th-A<Th-B<Th-C<Th-D is satisfied, which respectively corresponds to repeatedly sending the random access sequence for A times, B times, C times and D times; wherein, Th-A, Th-B, Th-C, Th-D, A, B, C and D are all positive integers.

when the UE measures that the signal quality information Q of the downlink reference signal sent by the eNodeB satisfies Q<Th-A, the random access sequence selected by the UE is required to be sent once;

when the UE measures that the signal quality information Q of the downlink reference signal sent by the eNodeB satisfies Th-A≤Q<Th-B, the random access sequence selected by the UE is required to be sent for A times;

when the UE measures that the signal quality information Q of the downlink reference signal sent by the eNodeB satisfies Th-B≤Q<Th-C, the random access sequence selected by the UE is required to be sent for B times;

when the UE measures that the signal quality information Q of the downlink reference signal sent by the eNodeB satisfies Th-C≤Q<Th-D, the random access sequence selected by the UE is required to be sent for C times;

when the UE measures that the signal quality information Q of the downlink reference signal sent by the eNodeB satisfies Q≥Th-D, the random access sequence selected by the UE is required to be sent for D times;

in the example, it is assumed that the UE1 determines that the number of times of needing to repeatedly send the random access sequence is C according to the above scheme, and it is assumed that Nseq=C, the UE1 selects one random access sequence from random access sequences supporting Nseq times of time-domain repetition, for example, a random access sequence selected by the UE1 is the Sequence1, and an index of the Sequence1 is the Sequence Index1.

Figure 2:
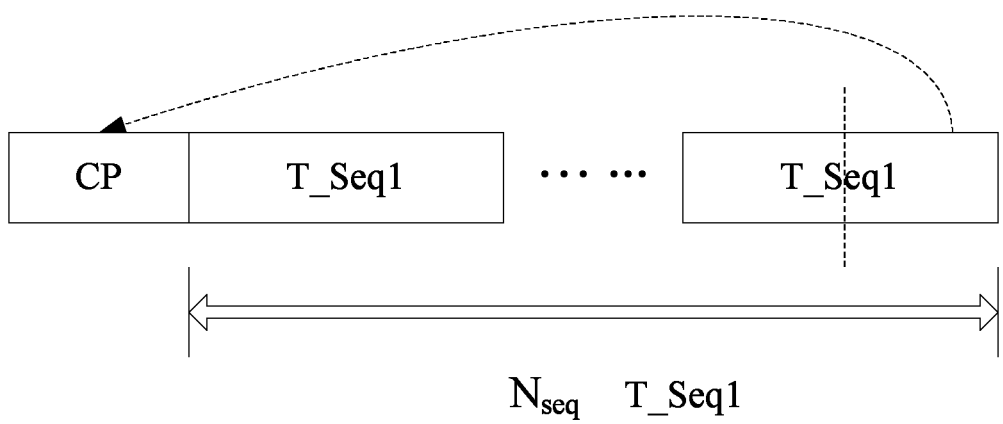
FIG. 2 is a schematic diagram of one random access signaling structure in the application examples 1~7 of the present invention.
Figure 5:
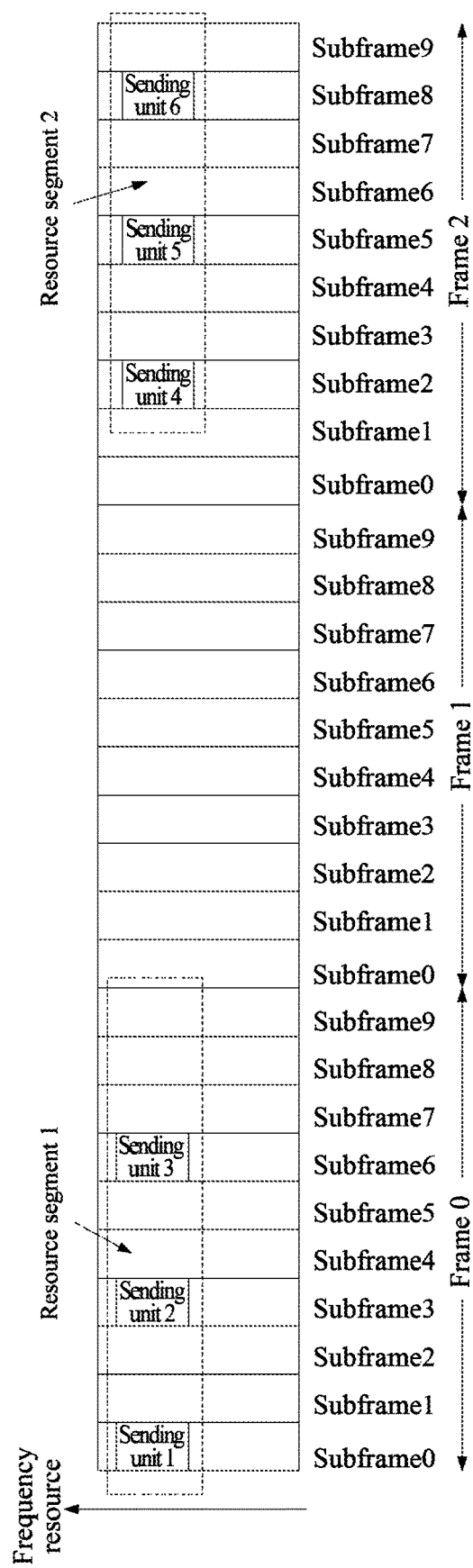
FIG. 5 is a schematic diagram of resource distribution of a random access channel in the application examples 1, 5, 6 and 7 of the present invention.

(b) Secondly, the UE1 sends a random access signaling Enhanced Sequence1 in a random access channel; wherein the constitution of the Enhanced Sequence1 is as shown in FIG. 2, and the Enhanced Sequence1 is formed by a combination of one CP and Nseq T_Sequences1 (see T_Seq1 in the figure). Wherein, T_Sequence1 is an expression form of the Sequence1 when the Sequence1 is sent in the time domain; the CP is a cyclic prefix, and it is constituted by a part of data in the T_Sequence1 according to standard configurations, and the sequences selected by the CP are as shown by a dotted box in FIG. 2 in the example. The resources occupied by the random access channel used by the UE1 include Nsegment resource Segments, each Segment includes Nunit sending Units, the time-domain length of each Unit is Nsubframe subframes, and Nsc subcarriers are occupied in the frequency domain;

in the example, the resource distribution situation of the random access channel used by the UE1 is as shown in FIG. 5, two resource Segments Segment 1 and Segment 2 are included, and the size of each Segment is one Frame. Both the Segment 1 and Segment 2 include three sending units, the time-domain length of each Unit is one subframe, 72 subcarriers are occupied in the frequency domain, and locations of the occupied frequency-domain subcarriers are identical. The distribution of the Units in the Segment 2 is the same as the distribution of the Units in the Segment 1. The UE1 sends the Enhanced Sequence1 in Unit1~Unit6.

(2) If successfully detecting the Enhanced Sequence1 sent by the UE1, the eNodeB sends a random access response message, and a mode for transmitting the message can be unicast, multicast or broadcast.

Wherein, location information of resources occupied by the random access response message is configured with standards or sent by the eNodeB to the UE1 in downlink control information or system information via a downlink channel;

the downlink control information also includes a M-bit CRC, and the CRC is scrambled with a M-bit RA-RNTI, and a scrambling formula is as shown in the following formula:

$$c_k = (b_k + a_k) \mod 2 \quad k=0,1,L,M-1$$

wherein, $b_k$ is the k+1th bit in bits of the CRC; $a_k$ is the k+1th bit in bits of the RA-RNTI; $c_k$ is the k+1th bit generated through the scrambling; and the RA-RNTI can be determined according to the following method:

$$\text{RA-RNTI} = f(\text{StartFrame}Idx, \text{StartSubframe}Idx, N_{RA-RNTI}, \text{offset}_{RA-RNTI}) = \mod(\text{StartFrame}Idx \times \alpha + \text{StartSubframe}Idx \times \beta, N_{RA-RNTI}) + \text{offset}_{RA-RNTI}$$

wherein:

f( ) is a functional operation operator;

RA-RNTI=f(StartFrameIdx, StartSubframeIdx, $N_{RA-RNTI}$, offset$_{RA-RNTI}$) represents that the RA-RNTI is obtained by performing f( ) functional operation on the StartFrameIdx, StartSubframeIdx, $N_{RA-RNTI}$ and offset$_{RA-RNTI}$;

mod(X, Y) represents a remainder operation of X to Y;

α and β are arbitrary real numbers;

the StartFrameIdx and StartSubframeIdx are respectively index information of frames and subframes corresponding to a start resource Unit1 occupied when the UE1 sends the random access signaling Enhanced Sequence1; if the Unit1 occupies multiple subframes, the StartFrameIdx can be index information of a frame in which the first subframe occupied by the Unit1 is located, and the StartSubframeIdx can be index information of the first subframe occupied by the Unit1; or, if the Unit1 occupies multiple subframes, the information indicated by the StartFrameIdx and StartSubframeIdx corresponding to which subframes in the Unit1 is configured with standards;

$N_{RA-RNTI}$ is the total number of distributable RA-RNTIs;

offset$_{RA-RNTI}$ is an offset.

In the example, it is assumed that α=10 and β=1; values of the $N_{RA-RNTI}$ and offset$_{RA-RNTI}$ are configured with standards by default and stored in the UE1, or they are configured by the eNodeB and informed to the UE1.

Alternatively, the downlink control information or system information also can include an HARQ mechanism enable identifier of the random access response message;

when the value of the HARQ mechanism enable identifier of the random access response message shows that an HARQ mechanism of the random access response message is enabled, the random access response message is transmitted with the HARQ mechanism; and when the value of the HARQ mechanism enable identifier of the random access response message shows that an HARQ mechanism of the random access response message is disenabled, a transmission mode used for the random access response message is configured with standards.

Moreover, information of the number of times of needing to repeatedly send the random access response message can be sent in the downlink control information or system information, or be configured with standards.

Figure 6:
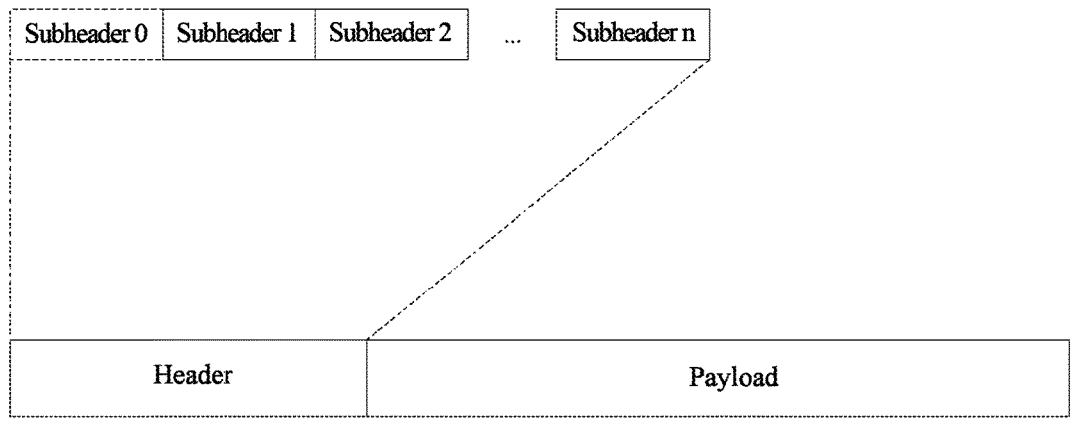
FIG. 6 is a schematic diagram of a structure of one random access response in the application examples 1~8 of the present invention.
Figure 7:
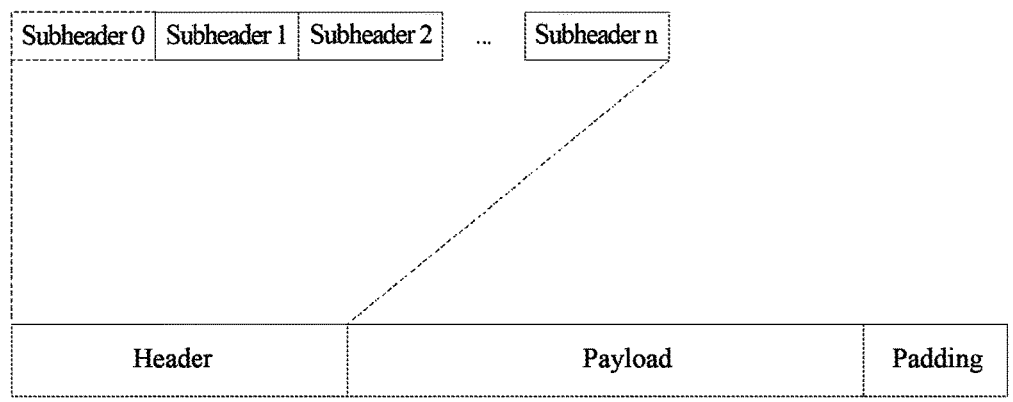
FIG. 7 is a schematic diagram of a structure of another random access response in the application examples 1~8 of the present invention.

The random access response message at least includes a header and a Payload, and the header includes one or more subheaders, as shown in FIG. 6. In addition, the random access response message also can include Padding, as shown in FIG. 7.

Figure 11:
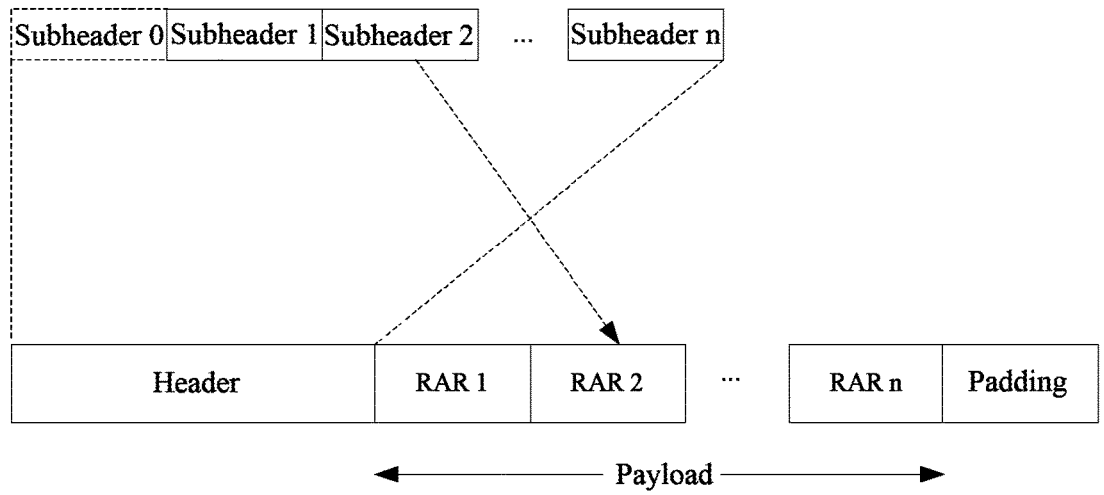
FIG. 11 is a schematic diagram of a mapping relationship between subheaders and time-frequency resource blocks in a payload in the application examples of the present invention.

In the example, the subheader corresponding to the UE1 is a subheader2, and the index information of the random access sequence, namely the index of the Sequence1 (Sequence Index1), is contained in the subheader 2;

the payload at least includes location information of uplink resources allocated to the UE1, and a location of the above location information of the uplink resources in the Payload is implicitly indicated by the subheader2, that is, a mapping relationship exists between the subheader2 and one time-frequency resource block (RAR2) in the Payload, as shown in FIG. 11, and after successfully decoding the subheader2, the UE continues to decode information in the RAR2 corresponding to the subheader2. Wherein, the information in the RAR2 at least includes the location information of the uplink resources allocated to the UE1; and then the UE1 can send a conflict detection message in corresponding uplink resources according to the analyzed location information of the uplink resources allocated.

Moreover, the above location information of the uplink resources contains index information of time-frequency resource blocks occupied by the uplink resources and/or indication information of time domain resources occupied by the uplink resources; and it also can contain the number of times of needing to repeatedly send the conflict detection information; wherein, the indication information of the time domain resources occupied by the uplink resources refers to indication information of frames and/or subframes occupied by the uplink resources; and the index information of the time-frequency resource blocks occupied by the uplink resources is used for indicating index information of the uplink resources in P (P>=1) time-frequency resource blocks.

It should be noted that the value of P and the size of a time-frequency resource block can be configured with standards or determined according to the random access information selected by the UE1; and the random access information selected by the UE1 can contain: the type of the random access sequence selected by the UE1, an index Sequence Index1 of the random access sequence Sequence1 selected by the UE1 and/or a time-domain repetition number Nseq.

(3) The UE1 sends conflict detection information to the eNodeB in the uplink resources indicated by the random access response message. Wherein, the conflict detection information at least includes K (the value of the K is configured with standards) bits of user identification information; wherein, the user identification information is used for uniquely identifying the user.

(4) After receiving the conflict detection information sent by the UE1, the eNodeB sends a conflict detection response message in a downlink channel; and a mode for transmitting the message is unicast, multicast or broadcast.

Wherein, location information of resources occupied by the conflict detection response message is sent by the eNodeB to the UE1 through the downlink control information or system information; and the location information of the resources occupied by the conflict detection response message contains index information of time-frequency resource blocks occupied and/or indication information of time domain resources occupied.

Alternatively, the indication information of the time domain resources refers to indication information of frames and/or subframes.

Moreover, information of the number of times of needing to repeatedly send the conflict detection response message can be sent in the downlink control information or system information; the value of the number of times can be configured with standards or determined according to the random access information selected by the UE1; in the example, the random access information selected by the UE1 can contain: the type of the random access sequence selected by the UE1, an index Sequence Index1 of the random access sequence Sequence1 selected by the UE1 and/or a time-domain repetition number Nseq.

In addition, the downlink control information or system information also can include an HARQ mechanism enable identifier of the conflict detection response message;

when the value of the HARQ mechanism enable identifier of the conflict detection response message shows that an HARQ mechanism of the conflict detection response message is enabled, the conflict detection response message is transmitted with the HARQ mechanism; and when the value of the HARQ mechanism enable identifier of the conflict detection response message shows that an HARQ mechanism of the conflict detection response message is disenabled, a transmission mode used for the conflict detection response message is configured with standards.

(5) After receiving the conflict detection response message sent by the eNodeB, the UE1 replies an answering message to the eNodeB; and the eNodeB confirms whether the UE1 successfully receives the conflict detection response message according to the message. Wherein, a resource location occupied by the UE1 sending the answering message of the conflict detection response message is obtained according to at least one of the following:

determined according to location indication information of resources of the answering message of the conflict detection response message allocated by the eNodeB to the current UE1 carried in the received conflict detection response message;

determined according to the random access information selected by the UE1;

determined according to the location information of the resources occupied by the received conflict detection response message.

Certainly, besides the calculation method for the RA-RNTI described in the example, the calculation method for the RA-RNTI also can be:

$$\text{RA-RNTI}=f(\text{StartFrame}Idx, \text{StartSubframe}Idx, \text{offset}_{RA\text{-}RNTI})=\text{StartFrame}Idx \times \alpha + \text{StartSubframe}Idx \times \beta + \text{offset}_{RA\text{-}RNTI}$$

or $$\text{RA-RNTI}=f(\text{StartFrame}Idx, \text{StartSubframe}Idx, \text{offset}_{RA\text{-}RNTI})=\lfloor \text{StartFrame}Idx \times \alpha + \text{StartSubframe}Idx \times \beta \rfloor + \text{offset}_{RA\text{-}RNTI}$$

or $$\text{RA-RNTI}=f(\text{StartFrame}Idx, \text{StartSubframe}Idx, \text{offset}_{RA\text{-}RNTI})=\lceil \text{StartFrame}Idx \times \alpha + \text{StartSubframe}Idx \times \beta \rceil + \text{offset}_{RA\text{-}RNTI}$$

wherein, $\lfloor \ \rfloor$ represents a round-down operation; $\lceil \ \rceil$ represents a round-up operation; and implications of other parameters are similar to the above descriptions, which will not be repeated here.

APPLICATION EXAMPLE 2

In a wireless communication system, a random access method includes the following steps.

(1) A terminal UE1 in the wireless communication system sends a random access signaling in a random access channel, and the random access signaling can be constituted in the following ways.

(a) Firstly, the UE1 determines the number of times of needing to repeatedly send a random access sequence, which includes:

the UE1 measuring the signal quality information of a downlink reference signal sent by the eNodeB, and comparing the signal quality information of the downlink reference signal with a preset threshold value, and determining the number of times of needing to repeatedly send the random access sequence;

wherein, the above downlink reference signal can be at least one of the following:

a cell-specific reference signal, a primary synchronization signal and a secondary synchronization signal; the signal quality information can be at least one of the following:

reference signal received power, a reference signal received quality, a received signal strength indicator, a path loss value between the UE1 and the eNodeB, and a signal to noise ratio of the downlink reference signal;

the preset threshold value can be configured with standards by default and stored in the UE1, or it can be configured with standards by default and stored in the eNodeB, and then be sent by the eNodeB to the UE1;

the preset threshold value includes at least one value;

wherein, the eNodeB can be one of the following:

a Macrocell, a Microcell, a Picocell, a Femtocell (also called a home eNodeB) and a Smallcell.

In the example, the scheme of the UE1 determining the number of times of needing to repeatedly send the random access sequence is described as follows.

For example, Th-A, Th-B, Th-C and Th-D are 4 predetermined threshold values, and Th-A<Th-B<Th-C<Th-D is satisfied, which respectively corresponds to repeatedly sending the random access sequence for A times, B times, C times and D times; wherein, Th-A, Th-B, Th-C, Th-D, A, B, C and D are all positive integers.

when the UE measures that the signal quality information Q of the downlink reference signal sent by the eNodeB satisfies Q<Th-A, the random access sequence selected by the UE is required to be sent once;

when the UE measures that the signal quality information Q of the downlink reference signal sent by the eNodeB satisfies Th-A≤Q<Th-B, the random access sequence selected by the UE is required to be sent for A times;

when the UE measures that the signal quality information Q of the downlink reference signal sent by the eNodeB satisfies Th-B≤Q<Th-C, the random access sequence selected by the UE is required to be sent for B times;

when the UE measures that the signal quality information Q of the downlink reference signal sent by the eNodeB satisfies Th-C≤Q<Th-D, the random access sequence selected by the UE is required to be sent for C times;

when the UE measures that the signal quality information Q of the downlink reference signal sent by the eNodeB satisfies Q≥Th-D, the random access sequence selected by the UE is required to be sent for D times;

in the example, it is assumed that the UE1 determines that the number of times of needing to repeatedly send the random access sequence is C according to the above scheme, and it is assumed that Nseq=C, the UE1 selects one random access sequence from available random access sequences, for example, a random access sequence selected by the UE1 is a Sequence1, and an index of the Sequence1 is a Sequence Index1.

Figure 3:
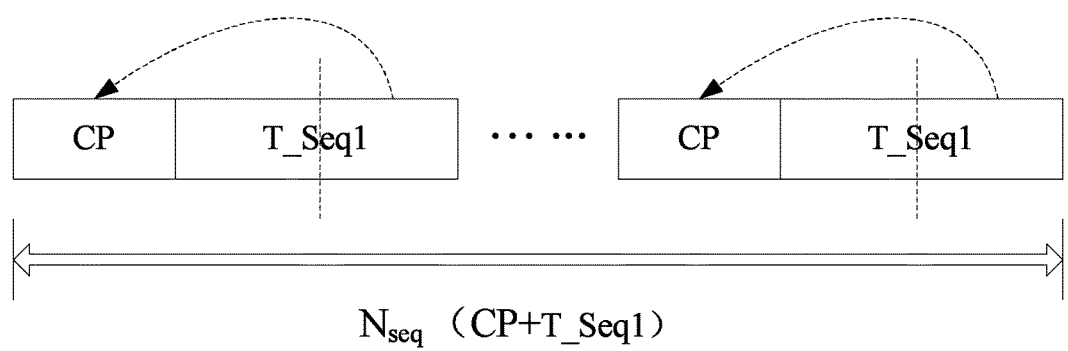
FIG. 3 is a schematic diagram of another random access signaling structure in the application examples 1~7 of the present invention.

(b) Secondly, the UE1 sends a random access signaling Enhanced Sequence1 in a random access channel; wherein, the constitution of the Enhanced Sequence1 is as shown in FIG. 3, and the Enhanced Sequence1 is formed by a combination of Nseq CPs and Nseq T_Sequences1 (see T_Seq1 in the figure). Wherein, T_Sequence1 is an expression form of the Sequence1 when the Sequence1 is sent in the time domain; the CP is a cyclic prefix, and it is constituted by a part of data in the T_Sequence1 according to standard configuration, and the sequences selected by the CPs are as shown by dotted boxes in FIG. 3 in the example.

The UE1 is required to select resources of the random access channel supporting Nseq times of repeatedly sending the random access sequence to send the Enhanced Sequence1.

Figure 8:
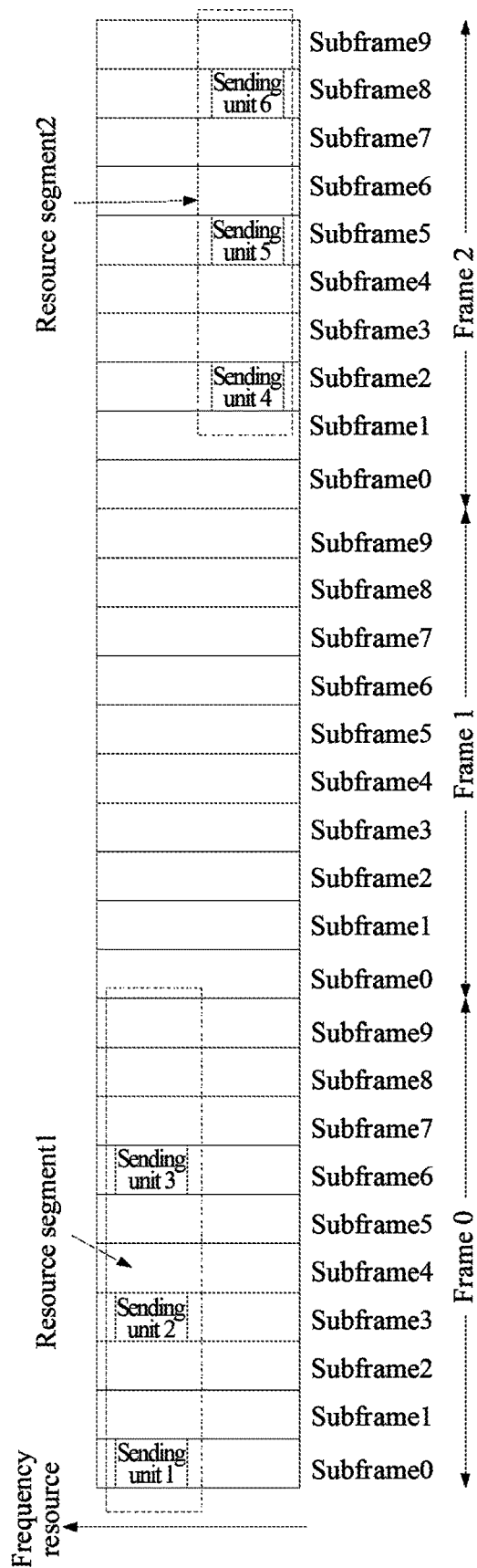
FIG. 8 is a schematic diagram of resource distribution of a random access channel in the application example 2 of the present invention.

The resources of the random access channel used by the UE1 include Nsegment resource Segments, each Segment includes Nunit sending Units, a time-domain length of each Unit is Nsubframe subframes, and Nsc subcarriers are occupied in the frequency domain;

in the example, the resource distribution situation of the random access channel used by the UE1 is as shown in FIG. 8, two resource Segments Segment 1 and Segment 2 are included, and the size of each Segment is one Frame. Both the Segment 1 and Segment 2 include three sending units, the time-domain length of each Unit is one subframe, 72 subcarriers are occupied in the frequency domain, and locations of the occupied frequency-domain subcarriers are identical. The distribution of the Units in the Segment 2 is different from the distribution of the Units in the Segment 1 in time domain and frequency domain. The UE1 sends the Enhanced Sequence1 in Unit1~Unit6.

(2) If successfully detecting the Enhanced Sequence1 sent by the UE1, the eNodeB sends a random access response message, and a mode for transmitting the message can be unicast, multicast or broadcast.

Wherein, location information of resources occupied by the random access response message is configured with standards or sent by the eNodeB to the UE1 in downlink control information or system information via a downlink channel;

the downlink control information also includes a M-bit CRC, and the CRC is scrambled with a M-bit RA-RNTI, and a scrambling formula is as shown in the following formula:

$$c_k=(b_k+a_k) \bmod 2 \quad k=0,1,L,M-1$$

wherein, $b_k$ is the k+1th bit in bits of the CRC; $a_k$ is the k+1th bit in bits of the RA-RNTI; $c_k$ is the k+1th bit generated through the scrambling;

the RA-RNTI can be determined according to the following method:

$$\text{RA-RNTI}=f(\text{StartFrame}Idx, \text{StartSubframe}Idx, \text{Frequency}Idx, N_{RA\text{-}RNTI}, \text{offset}_{RA\text{-}RNTI})=\bmod(\text{StartFrame}Idx \times \alpha + \text{StartSubframe}Idx \times \beta + \text{Frequency}Idx \times \gamma, N_{RA\text{-}RNTI}) + \text{offset}_{RA\text{-}RNTI}$$

wherein:

f( ) is a functional operation operator;

RA-RNTI=f(StartFrameIdx, StartSubframeIdx, FrequencyIdx, $N_{RA\text{-}RNTI}$, offset$_{RA\text{-}RNTI}$) represents that the RA-RNTI is obtained by performing f( ) functional operation on the StartFrameIdx, StartSubframeIdx, FrequencyIdx, $N_{RA\text{-}RNTI}$ and offset$_{RA\text{-}RNTI}$;

mod(X, Y) represents a remainder operation of X to Y;

α, β and γ are arbitrary real numbers;

$N_{RA\text{-}RNTI}$ is the total number of distributable RA-RNTIs;

the StartFrameIdx, StartSubframeIdx and FrequencyIdx are respectively index information of frames, subframes and frequency domain resources corresponding to a start resource Unit1 occupied when the UE1 sends the Enhanced Sequence1; if the Unit1 occupies multiple subframes, the StartFrameIdx can be index information of a frame in which the first subframe occupied by the Unit1 is located, and the StartSubframeIdx can be index information of the first subframe occupied by the Unit1, and the FrequencyIdx can be index information of frequency resources in the first subframe occupied by the Unit1; or, if the Unit1 occupies multiple subframes, the information indicated by the Start- FrameIdx, StartSubframeIdx and FrequencyIdx corresponding to which subframes in the Unit1 is configured with standards;

offset$_{RA-RNTI}$ is one offset.

Alternatively, the downlink control information or system information also can include a HARQ mechanism enable identifier of the random access response message;

when the value of the HARQ mechanism enable identifier of the random access response message shows that an HARQ mechanism of the random access response message is enabled, the random access response message is transmitted with the HARQ mechanism; and when the value of the HARQ mechanism enable identifier of the random access response message shows that a HARQ mechanism of the random access response message is disenabled, a transmission mode used for the random access response message is configured with standards.

Moreover, information of the number of times of needing to repeatedly send the random access response message can be sent in the downlink control information or system information, or be configured with standards.

The random access response message at least includes a header and a Payload, and the header includes one or more subheaders, as shown in FIG. 6. In addition, the random access response message also can include Padding, as shown in FIG. 7.

In the example, the subheader corresponding to the UE1 is a subheader2, and the index information of the random access sequence, namely the index of the Sequence1 (Sequence Index1), is contained in the subheader 2;

the payload includes location information of uplink resources allocated to the UE1, and location information of the above location information in the payload is directly indicated by the subheader2, or is indicated through the downlink control information or system information; the uplink resources are used for the UE1 sending a conflict detection message.

Moreover, the above location information of the uplink resources contains index information of time-frequency resource blocks occupied by the uplink resources and/or indication information of time domain resources occupied by the uplink resources, and it also can include the number of times of needing to repeatedly send the conflict detection information; wherein, the indication information of the time domain resources occupied by the uplink resources refers to indication information of frames and/or subframes occupied by the uplink resources; and the indication information of the time domain resources occupied by the uplink resources also can be configured with standards or determined according to the random access information selected by the UE1;

in the example, the random access information selected by the UE1 can contain: the type of the random access sequence selected by the UE1, the index Sequence Index1 of the random access sequence Sequence1 selected by the UE1 and/or a time-domain repetition number Nseq;

the index information of the time-frequency resource blocks occupied by the uplink resources is used for indicating index information of the uplink resources in P (P>=1) time-frequency resource blocks.

It should be noted that the value of P and the size of a time-frequency resource block can be configured with standards or determined according to the random access information selected by the UE1; and the random access information selected by the UE1 can contain: the type of the random access sequence selected by the UE1, the index Sequence Index1 of the random access sequence Sequence1 selected by the UE1 and/or a time-domain repetition number Nseq.

(3) The UE1 sends conflict detection information to the eNodeB in the uplink resources indicated by the random access response message. Wherein, the conflict detection information at least includes K (the value of the K is configured with standards) bits of user identification information.

(4) After receiving the conflict detection information sent by the UE1, the eNodeB sends a conflict detection response message in a downlink channel; and a mode for transmitting the message is unicast, multicast or broadcast.

Wherein, location information of resources occupied by the conflict detection response message is sent by the eNodeB to the UE1 through the downlink control information or system information; and the location information of the resources occupied by the conflict detection response message contains index information of time-frequency resource blocks occupied and/or indication information of time domain resources occupied.

Alternatively, the indication information of the time domain resources refers to indication information of frames and/or subframes.

Moreover, information of the number of times of needing to repeatedly send the conflict detection response message can be sent through the downlink control information or system information; the value of the number of times can be configured with standards or determined according to the random access information selected by the UE1;

in the example, the random access information selected by the UE1 can contain: the type of the random access sequence selected by the UE1, the index Sequence Index1 of the random access sequence Sequence1 selected by the UE1 and/or a time-domain repetition number Nseq.

In addition, the downlink control information or system information also can include a HARQ mechanism enable identifier of the conflict detection response message;

when the value of the HARQ mechanism enable identifier of the random access response message shows that a HARQ mechanism of the random access response message is enabled, the conflict detection response message is transmitted with the HARQ mechanism; and when the value of the HARQ mechanism enable identifier of the random access response message shows that a HARQ mechanism of the random access response message is disenabled, a transmission mode used for the conflict detection response message is configured with standards.

(5) After receiving the conflict detection response message sent by the eNodeB, the UE1 replies an answering message to the eNodeB; and the eNodeB confirms whether the UE1 successfully receives the conflict detection response message according to the message.

Wherein, a resource location occupied by the UE1 sending the answering message of the conflict detection response message is obtained according to at least one of the following:

determined according to location indication information of resources of the answering message of the conflict detection response message allocated by the eNodeB to the current UE1 carried in the received conflict detection response message;

determined according to the random access information selected by the UE1;

determined according to the location information of the resources occupied by the received conflict detection response message.

Certainly, besides the calculation method for the RA-RNTI described in the example, the calculation method for the RA-RNTI also can be:

RA-RNTI=$f$(StartFrame$Idx$,StartSubframe$Idx$, offset$_{RA\text{-}RNTI}$)=StartFrame$Idx\times\alpha$+StartSubframe$Idx\times\beta$+offset$_{RA\text{-}RNTI}$ or RA-RNTI=$f$(StartFrame$Idx$,StartSubframe$Idx$, offset$_{RA\text{-}RNTI}$)=⌊StartFrame$Idx\times\alpha$+StartSubframe$Idx\times\beta$⌋+offset$_{RA\text{-}RNTI}$ or RA-RNTI=$f$(StartFrame$Idx$,StartSubframe$Idx$, offset$_{RA\text{-}RNTI}$)=⌈StartFrame$Idx\times\alpha$+StartSubframe$Idx\times\beta$⌉+offset$_{RA\text{-}RNTI}$ wherein: ⌊ ⌋ represents a round-down operation; ⌈ ⌉ represents a round-up operation; and implications of other parameters are similar to the above descriptions, which will not be repeated here.

APPLICATION EXAMPLE 3

In a wireless communication system, a random access method includes the following steps.

(1) A terminal UE1 in the wireless communication system sends a random access signaling in a random access channel, and the random access signaling can be constituted in the following ways.

(a) Firstly, the UE1 determines the number of times of needing to repeatedly send a random access sequence, which includes:

the UE1 measuring the signal quality information of a downlink reference signal sent by the eNodeB, and comparing the signal quality information of the downlink reference signal with a preset threshold value, and determining the number of times of needing to repeatedly send the random access sequence;

wherein, the above downlink reference signal can be at least one of the following:

a cell-specific reference signal, a primary synchronization signal and a secondary synchronization signal;

the signal quality information can be at least one of the following:

reference signal received power, a reference signal received quality, a received signal strength indicator, a path loss value between the UE1 and the eNodeB, and a signal to noise ratio of the downlink reference signal;

the preset threshold value can be configured with standards by default and stored in the UE1, or it can be configured with standards by default and stored in the eNodeB, and then be sent by the eNodeB to the UE1;

the preset threshold value includes at least one value;

wherein, the base station can be one of the following:

a Macrocell, a Microcell, a Picocell, a Femtocell (also called a home eNodeB) and a Smallcell.

In the example, the scheme of the UE1 determining the number of times of needing to repeatedly send the random access sequence is described as follows.

For example, Th-A is a predetermined threshold value, when the UE measures that the signal quality information Q of the downlink reference signal sent by the eNodeB satisfies Q<Th-A, the random access sequence selected by the UE is required to be sent once; and when the UE measures that the signal quality information Q of the downlink reference signal sent by the eNodeB satisfies Q≥Th-A, the random access sequence selected by the UE is required to be repeatedly sent for multiple times, and the times of repeatedly sending can be determined by the terminal itself.

in the example, it is assumed that the UE1 determines that the number of times of needing to repeatedly send the random access sequence is Nseq according to the above scheme, and the UE1 selects one random access sequence from random access sequences supporting Nseq times of time-domain repetition, for example, a random access sequence selected by the UE1 is a Sequence1, and an index of the Sequence1 is a Sequence Index1.

Figure 4:
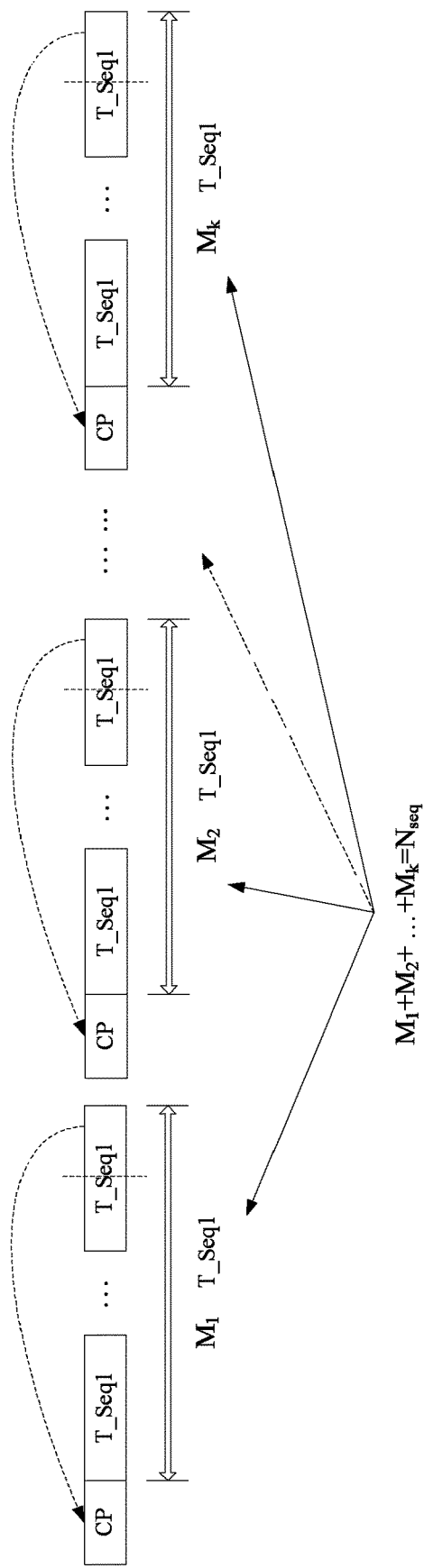
FIG. 4 is a schematic diagram of another random access signaling structure in the application examples 3, 4, 5, 7 and 8 of the present invention.

(b) Secondly, the UE1 sends a random access signaling Enhanced Sequence1 in a random access channel; wherein, the constitution of the Enhanced Sequence1 is as shown in FIG. 4, the Enhanced Sequence1 is formed by k parts, the ith part includes a sequence of repeating the T_Sequence1 for $M_i$ times and one CP, $1<=i<=k$, and $M_1+M_2+\ldots+M_k=N_{seq}$; the CP is a cyclic prefix, and it is constituted by a part of data in the T_Sequence1 according to standard configurations, and the sequences selected by the CPs are as shown by a dotted box in FIG. 4 in the embodiment.

The resources occupied by the random access channel used by the UE1 include Nsegment resource Segments, each Segment includes Nunit sending Units, a time-domain length of each Unit is Nsubframe subframes, and Nsc subcarriers are occupied in the frequency domain.

Figure 9:
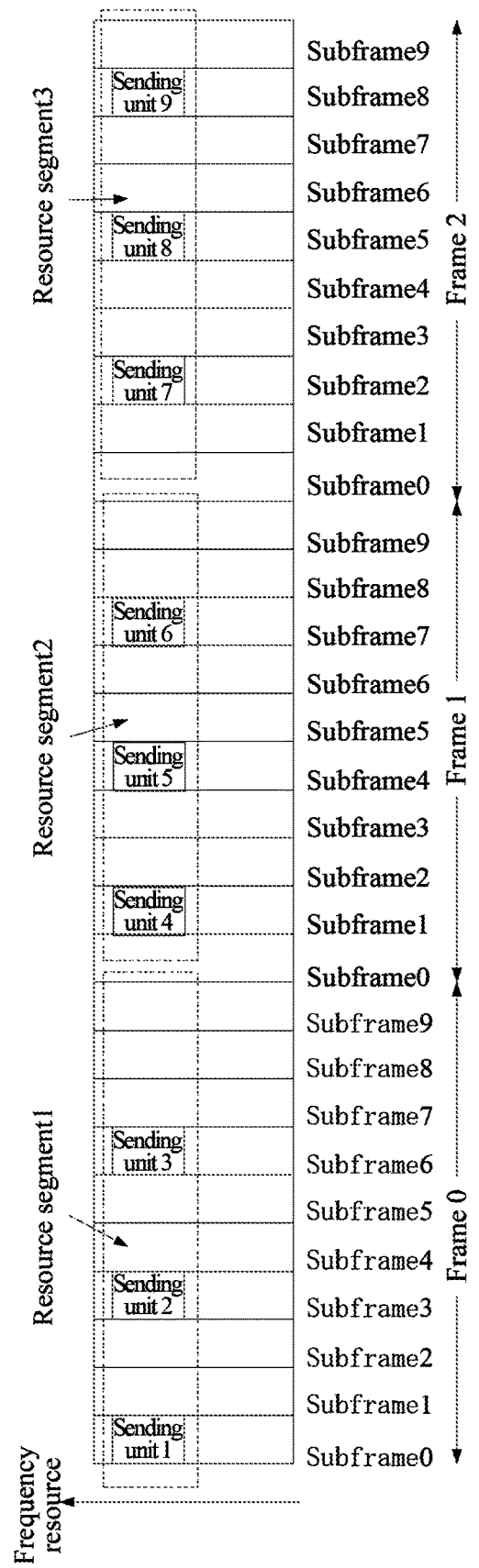
FIG. 9 is a schematic diagram of resource distribution of a random access channel in the application example 3 of the present invention.

In the example, the resource distributed situation of the random access channel used by the UE1 is as shown in FIG. 9, three resource Segments Segment 1, Segment 2 and Segment 3 are included, and the size of each Segment is one Frame, and each Segment includes three sending Units, and the time-domain length of each Unit is one subframe, 72 subcarriers are occupied in the frequency domain, and locations of the occupied frequency-domain subcarriers are identical. The distribution of the Units in the Segment 2 and Segment 3 is the same as the distribution of the Units in the Segment 1. The UE1 occupies a Unit2, Unit3, Unit5, Unit6, Unit8 and Unit9 to send the Enhanced Sequence1.

(2) If successfully detecting the Enhanced Sequence1 sent by the UE1, the eNodeB sends a random access response message, and a mode for transmitting the message can be unicast, multicast or broadcast.

Wherein, location information of resources occupied by the random access response message is configured with standards or sent by the eNodeB to the UE1 in downlink control information or system information via a downlink channel; the downlink control information also includes a M-bit CRC, and the CRC is scrambled with a M-bit RA-RNTI, and a scrambling formula is as shown in the following formula:

$$c_k=(b_k+a_k) \bmod 2 \ k=0,1,L,M-1$$

wherein, $b_k$ is the k+1th bit in bits of the CRC; $a_k$ is the k+1th bit in bits of the RA-RNTI; $c_k$ is the k+1th bit generated through the scrambling;

the RA-RNTI can be determined according to the following method:

RA-RNTI=$f$(SegmentStartFrame$Idx$,SegmentStartSubframe$Idx$,$N_{RA\text{-}RNTI}$,offset$_{RA\text{-}RNTI}$)=mod(SegmentStartFrame$Idx\times\alpha$+SegmentStartSubframe$Idx\times\beta$,$N_{RA\text{-}RNTI}$)+offset$_{RA\text{-}RNTI}$ wherein:

$f($ $)$ is a functional operation operator;

RA-RNTI=$f$(SegmentStartFrameIdx, SegmentStartSubframeIdx, $N_{RA\text{-}RNTI}$, offset$_{RA\text{-}RNTI}$) represents that the RA- RNTI is obtained by performing f( ) functional operation on the SegmentStartFrameIdx, SegmentStartSubframeIdx, $N_{RA-RNTI}$ and offset$_{RA-RNTI}$;

mod(X, Y) represents a remainder operation of X to Y;

α and β are arbitrary real numbers;

the SegmentStartFrameIdx and SegmentStartSubframeIdx are respectively index information of frames and subframes corresponding to a start resource Unit1 of the first Segment (i.e. Segment1) occupied when the UE1 sends the random access signaling Enhanced Sequence1; if the Unit1 occupies multiple subframes, the SegmentStartFrameIdx can be index information of a frame in which the first subframe occupied by the Unit1 is located, and the SegmentStartSubframeIdx can be index information of the first subframe occupied by the Unit1; or, if the Unit1 occupies multiple subframes, the information indicated by the SegmentStartFrameIdx and SegmentStartSubframeIdx corresponding to which subframes in the Unit1 is configured with standards;

$N_{RA-RNTI}$ is the total number of distributable RA-RNTIs;

offset$_{RA-RNTI}$ is one offset.

In the example, it is assumed that α=10 and β=1; values of the $N_{RA-RNTI}$ and offset$_{RA-RNTI}$ are configured with standards by default and stored in the eNodeB and UE1, or they are configured by the eNodeB and informed to the UE1;

Alternatively, the downlink control information or system information also can include a HARQ mechanism enable identifier of the random access response message;

when the value of the HARQ mechanism enable identifier of the random access response message shows that a HARQ mechanism of the random access response message is enabled, the random access response message is transmitted with the HARQ mechanism; and when the value of the HARQ mechanism enable identifier of the random access response message shows that an HARQ mechanism of the random access response message is disenabled, a transmission mode used for the random access response message is configured with standards; the random access response message at least includes a header and a Payload, and the header includes one or more subheaders, as shown in FIG. 6. In addition, the random access response message also can include Padding, as shown in FIG. 7.

In the example, the subheader corresponding to the UE1 is a subheader2, and index information of the random access sequence, namely the index of the Sequence1 (Sequence Index1), is contained in the subheader 2. Moreover, the subheader2 is scrambled with an RA-RNTI, and a scrambling mode is:

$$f_i = (d_i + e_i) \bmod 2 \ i=0,1,L,Q-1$$

wherein, $d_i$ is the i+1th bit in information bits of a subheader2 that is not scrambled, $e_i$ is the i+1th bit in Q information bits in the RA-RNTI, and a selection rule thereof is configured with standards; $f_i$ is the i+1th bit in bits of a subheader2 that is scrambled.

Moreover, information of the number of times of needing to repeatedly send the random access response message can be sent in the downlink control information or system information, or be configured with standards.

The payload at least includes location information of uplink resources allocated to the UE1, and the location of the above location information of the uplink resources in the Payload is implicitly indicated by the subheader2, that is, a mapping relationship exists between the subheader2 and one time-frequency resource block (RAR2) in the Payload, as shown in FIG. 11, and after successfully decoding the subheader2, the UE continues to decode information in the RAR2 corresponding to the subheader2. Wherein, the information in the RAR2 at least includes the location information of the uplink resources allocated to the UE1; and then the UE1 can send a conflict detection message in corresponding uplink resources according to the analyzed location information of the uplink resources allocated.

Moreover, the above location information of the uplink resources contains index information of time-frequency resource blocks occupied by the uplink resources and/or indication information of time domain resources occupied by the uplink resources, and it also can include the number of times of needing to repeatedly send the conflict detection information; wherein, the indication information of the time domain resources occupied by the uplink resources refers to indication information of frames and/or subframes occupied by the uplink resources; and the indication information of the time domain resources occupied by the uplink resources also can be configured with standards or determined according to the random access information selected by the UE1; in the example, the random access information selected by the UE1 can contain: the type of the random access sequence selected by the UE1, an index Sequence Index1 of the random access sequence Sequence1 selected by the UE1 and/or a time-domain repetition number Nseq;

the index information of the time-frequency resource blocks occupied by the uplink resources is used for indicating index information of the uplink resources in P (P>=1) time-frequency resource blocks.

It should be noted that the value of P and the size of a time-frequency resource block can be configured with standards or determined according to the random access information selected by the UE1.

(3) The UE1 sends conflict detection information to the eNodeB in the uplink resources indicated by the random access response message. Wherein, the conflict detection information at least includes K (the value of the K is configured with standards) bits of user identification information.

(4) After receiving the conflict detection information sent by the UE1, the eNodeB sends a conflict detection response message in a downlink channel; and a mode for transmitting the message is unicast, multicast or broadcast.

Wherein, location information of resources occupied by the conflict detection response message is sent by the eNodeB to the UE1 through the downlink control information or system information; and the location information of the resources occupied by the conflict detection response message contains index information of time-frequency resource blocks occupied and/or indication information of time domain resources occupied.

Alternatively, the indication information of the time domain resources refers to indication information of frames and/or subframes.

Moreover, information of the number of times of needing to repeatedly send the conflict detection response message can be sent in the downlink control information or system information; the value of the number of times can be configured with standards or determined according to the random access information selected by the UE1.

In addition, the downlink control information or system information also can include a HARQ mechanism enable identifier of the conflict detection response message;

when the value of the HARQ mechanism enable identifier of the random access response message shows that a HARQ mechanism of the random access response message is enabled, the conflict detection response message is transmitted with the HARQ mechanism; and when the value of the HARQ mechanism enable identifier of the random access response message shows that an HARQ mechanism of the random access response message is disenabled, a transmission mode used for the conflict detection response message is configured with standards.

(5) After receiving the conflict detection response message sent by the eNodeB, the UE1 replies an answering message to the eNodeB; and the eNodeB confirms whether the UE1 successfully receives the conflict detection response message according to the message.

Wherein, a resource location occupied by the UE1 sending the answering message of the conflict detection response message is obtained according to at least one of the following:

determined according to location indication information of resources of the answering message of the conflict detection response message allocated by the eNodeB to the current UE1 carried in the received conflict detection response message;

determined according to the random access information selected by the UE1;

determined according to the location information of the resources occupied by the received conflict detection response message.

Certainly, besides the calculation method for the RA-RNTI described in the example, the calculation method for the RA-RNTI also can be:

$$\text{RA-RNTI} = f(\text{StartFrame}Idx, \text{StartSubframe}Idx, \text{offset}_{RA\text{-}RNTI}) = \text{StartFrame}Idx \times \alpha + \text{StartSubframe}Idx \times \beta + \text{offset}_{RA\text{-}RNTI}$$

or $$\text{RA-RNTI} = f(\text{StartFrame}Idx, \text{StartSubframe}Idx, \text{offset}_{RA\text{-}RNTI}) = \lfloor \text{StartFrame}Idx \times \alpha + \text{StartSubframe}Idx \times \beta \rfloor + \text{offset}_{RA\text{-}RNTI}$$

or $$\text{RA-RNTI} = f(\text{StartFrame}Idx, \text{StartSubframe}Idx, \text{offset}_{RA\text{-}RNTI}) = \lceil \text{StartFrame}Idx \times \alpha + \text{StartSubframe}Idx \times \beta \rceil + \text{offset}_{RA\text{-}RNTI}$$

wherein, $\lfloor \ \rfloor$ represents a round-down operation; $\lceil \ \rceil$ represents a round-up operation; and implications of other parameters are similar to the above descriptions, which will not be repeated here.

APPLICATION EXAMPLE 4

In a wireless communication system, a random access method includes the following steps.

(1) A terminal UE1 in the wireless communication system sends a random access signaling in a random access channel, and the random access signaling can be constituted in the following ways.

(a) Firstly, the UE1 determines the number of times of needing to repeatedly send a random access sequence, which includes:

the UE1 measuring the signal quality information of a downlink reference signal sent by the eNodeB, and comparing the signal quality information of the downlink reference signal with a preset threshold value, and determining the number of times of needing to repeatedly send the random access sequence;

wherein, the above downlink reference signal can be at least one of the following:

a cell-specific reference signal, a primary synchronization signal and a secondary synchronization signal;

the signal quality information can be at least one of the following:

reference signal received power, a reference signal received quality, a received signal strength indicator, a path loss value between the UE1 and the eNodeB, and a signal to noise ratio of the downlink reference signal;

the predetermined threshold value can be configured with standards by default and stored in the UE1, or it can be configured with standards by default and stored in the eNodeB, and then be sent by the eNodeB to the UE1;

wherein, the predetermined threshold value includes one or more values;

wherein, the base station can be one of the following:

a Macrocell, a Microcell, a Picocell, a Femtocell (also called a home eNodeB) and a Smallcell.

In the example, the scheme of the UE1 determining the number of times of needing to repeatedly send the random access sequence is described as follows.

For example, Th-A is a predetermined threshold value, when the UE measures that the signal quality information Q of the downlink reference signal sent by the eNodeB satisfies Q<Th-A, the random access sequence selected by the UE is required to be sent once; and when the UE measures that the signal quality information Q of the downlink reference signal sent by the eNodeB satisfies Q≥Th-A, the random access sequence selected by the UE is required to be repeatedly sent for multiple times, and the times of repeatedly sending can be determined by the UE itself.

In the example, it is assumed that the UE1 determines that the number of times of needing to repeatedly send the random access sequence is Nseq according to the above scheme, and the UE1 selects one random access sequence from available random access sequences, for example, a random access sequence selected by the UE1 is a Sequence1, and an index of the Sequence1 is a Sequence Index1.

(b) Secondly, the UE1 sends a random access signaling Enhanced Sequence1 in a random access channel; wherein, the constitution of the Enhanced Sequence1 is as shown in FIG. 2 or FIG. 3 or FIG. 4, to choose which type is configured with standards. Wherein, T_Sequence1 (see T_Seq1 in the figure) is an expression form of the Sequence1 when the Sequence1 is sent in the time domain; the CP is a cyclic prefix, and it is constituted by a part of data in the T_Sequence1 according to standard configurations.

The UE1 is required to select resources of the random access channel supporting Nseq times of repeatedly sending the random access sequence to send the Enhanced Sequence1.

Figure 10:
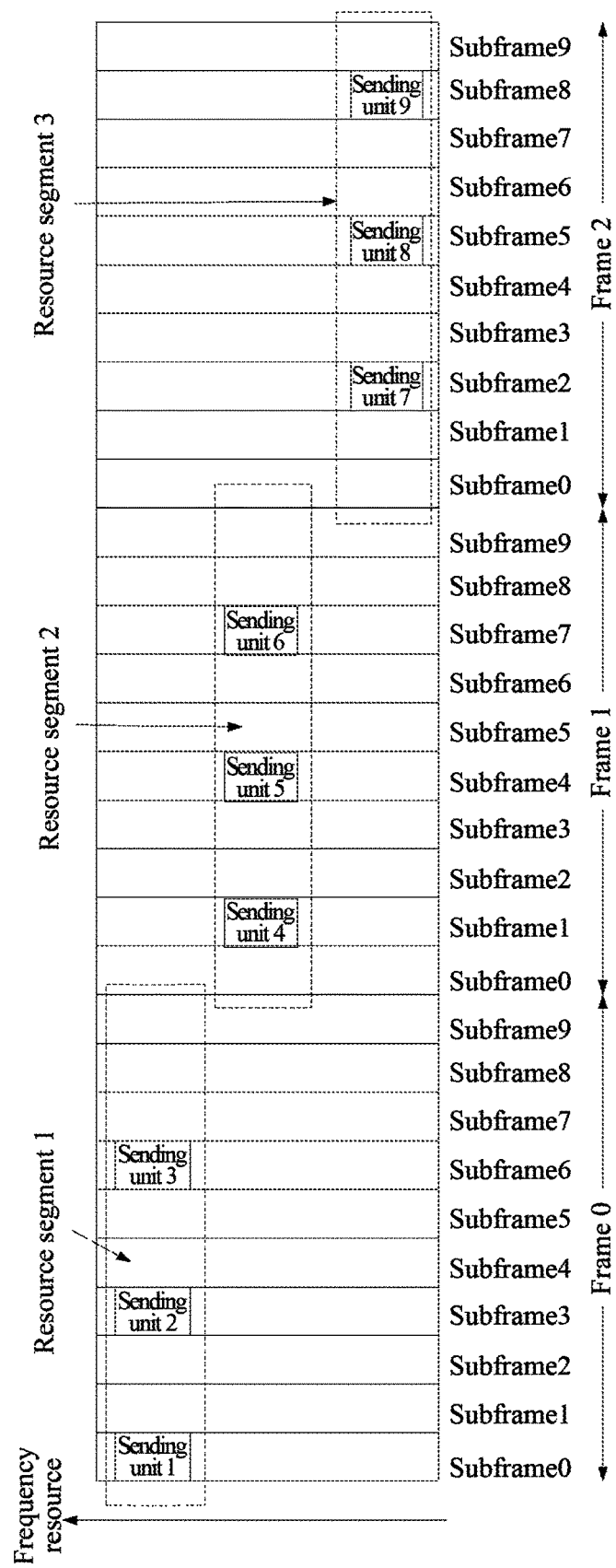
FIG. 10 is a schematic diagram of resource distribution of a random access channel in the application example 4 of the present invention.

The resources of the random access channel used by the UE1 include Nsegment resource Segments, each Segment includes Nunit sending Units, a time-domain length of each Unit is Nsubframe subframes, and Nsc subcarriers are occupied in the frequency domain;

In the example, the resource distributed situation of the random access channel used by the UE1 is as shown in FIG. 10, three resource Segments Segment 1, Segment 2 and Segment 3 are included. The size of each Segment is one Frame, and each Segment includes three sending Units, the time-domain length of each Unit is one subframe, 72 subcarriers are occupied in the frequency domain, and locations of the occupied frequency-domain subcarriers are identical.

The distribution of the Units in the Segment 2 and Segment 3 is different from the distribution of the Units in the Segment 1 in time domain and frequency domain. The UE1 sends the Enhanced Sequence1 in a Unit2, Unit3, Unit5, Unit6, Unit8 and Unit9.

(2) If successfully detecting the Enhanced Sequence1 sent by the UE1, the eNodeB sends a random access response message, and a mode for transmitting the message can be unicast, multicast or broadcast.

Wherein, location information of resources occupied by the random access response message is configured with standards or sent by the eNodeB to the UE1 in downlink control information or system information via a downlink channel;

the downlink control information also includes a M-bit CRC, and the CRC is scrambled with a M-bit RA-RNTI, and a scrambling formula is as shown in the following formula:

$$c_k=(b_k+a_k) \bmod 2 \; k=0,1,L,M-1$$

wherein, $b_k$ is the k+1th bit in bits of the CRC; $a_k$ is the k+1th bit in bits of the RA-RNTI; $c_k$ is the k+1th bit generated through the scrambling;

the RA-RNTI is determined according to the following method:

RA-RNTI=$f$(SegmentStartFrame$Idx$,SegmentStart-Subframe$Idx$,SegmentFrequency$Idx$,$N_{RA\text{-}RNTI}$, offset$_{RA\text{-}RNTI}$)=mod(SegmentStartFrame$Idx \times \alpha$+ SegmentStartSubframe$Idx \times \beta$+ SegmentFrequency$Idx \times \gamma$,$N_{RA\text{-}RNTI}$)+offset$_{RA\text{-}RNTI}$ wherein:

f( ) is a functional operation operator;

RA-RNTI=f(SegmentStartFrameIdx, SegmentStartSubframeIdx, SegmentFrequencyIdx, $N_{RA\text{-}RNTI}$, offset$_{RA\text{-}RNTI}$) represents that the RA-RNTI is obtained by performing f( ) functional operation on the SegmentStartFrameIdx, SegmentStartSubframeIdx, SegmentFrequencyIdx, $N_{RA\text{-}RNTI}$ and offset$_{RA\text{-}RNTI}$;

mod(X, Y) represents a remainder operation of X to Y;

$\alpha$, $\beta$ and $\gamma$ are arbitrary real numbers;

$N_{RA\text{-}RNTI}$ is the total number of distributable RA-RNTIs;

the SegmentStartFrameIdx, SegmentStartSubframeIdx and SegmentFrequencyIdx are respectively index information of frames, subframes and frequency resources corresponding to a start resource Unit1 of the first Segment (i.e. Segment1) occupied when the UE1 sends the Enhanced Sequence1; if the Unit1 occupies multiple subframes, the SegmentStartFrameIdx can be index information of a frame in which the first subframe occupied by the Unit1 is located, the SegmentStartSubframeIdx can be index information of the first subframe occupied by the Unit1, and the SegmentFrequencyIdx can be index information of frequency resources in the first subframe occupied by the Unit1; or, if the Unit1 occupies multiple subframes, the information indicated by the SegmentStartFrameIdx, SegmentStartSubframeIdx and SegmentFrequencyIdx corresponding to which subframes in the Unit1 is configured with standards;

offset$_{RA\text{-}RNTI}$ is one offset.

Alternatively, the downlink control information or system information also can include a HARQ mechanism enable identifier of the random access response message;

when the value of the HARQ mechanism enable identifier of the random access response message shows that a HARQ mechanism of the random access response message is enabled, the random access response message is transmitted with the HARQ mechanism; and when the value of the HARQ mechanism enable identifier of the random access response message shows that a HARQ mechanism of the random access response message is disenabled, a transmission mode used for the random access response message is configured with standards.

Moreover, information of the number of times of needing to repeatedly send the random access response message can be sent in the downlink control information or system information, or be configured with standards.

The random access response message at least includes a header and a Payload, and the header includes one or more subheaders, as shown in FIG. 6. In addition, the random access response message also can include Padding, as shown in FIG. 7.

In the example, the subheader corresponding to the UE1 is a subheader2, and index information of the random access sequence, namely an index of the Sequence1 (Sequence Index1), is contained in the subheader 2. Moreover, the subheader2 is scrambled with an RA-RNTI, and a scrambling mode is:

$$f_i=(d_i+e_i) \bmod 2 \; i=0,1,L,Q-1$$

wherein, $d_i$ is the i+1th bit in information bits of a subheader2 that is not scrambled, $e_i$ is the i+1th bit in Q information bits in the RA-RNTI, and a selection rule thereof is configured with standards; $f_i$ is the i+1th bit in bits of a subheader2 that is scrambled;

the payload at least includes location information of uplink resources allocated to the UE1, location information of the above location information in the payload is directly indicated by the subheader2, or is indicated through the downlink control information or system information; the UE1 can send a conflict detection message in corresponding uplink resources according to an indication.

Moreover, the above location information of the uplink resources contains index information of time-frequency resource blocks occupied by the uplink resources and/or indication information of time domain resources occupied by the uplink resources, and it also can include the number of times of needing to repeatedly send the conflict detection information; wherein, the indication information of the time domain resources occupied by the uplink resources refers to indication information of frames and/or subframes occupied by the uplink resources;

the indication information of the time domain resources occupied by the uplink resources also can be configured with standards or determined according to the random access information selected by the UE1; in the example, the random access information selected by the UE1 can contain: the type of the random access sequence selected by the UE1, the index Sequence Index1 of the random access sequence Sequence1 selected by the UE1 and/or a time-domain repetition number Nseq;

the index information of the time-frequency resource blocks occupied by the uplink resources is used for indicating index information of the uplink resources in P (P>=1) time-frequency resource blocks.

It should be noted that the value of P and the size of a time-frequency resource block can be configured with standards or determined according to the random access information selected by the UE1.

(3) The UE1 sends conflict detection information to the eNodeB in the uplink resources indicated by the random access response message. Wherein, the conflict detection information at least includes K (the value of the K is configured with standards) bits of user identification information.

(4) After receiving the conflict detection information sent by the UE1, the eNodeB sends a conflict detection response message in a downlink channel; and a mode for transmitting the message is unicast, multicast or broadcast.

Wherein, location information of resources occupied by the conflict detection response message is sent by the eNodeB to the UE1 through the downlink control information or system information; and the location information of the resources occupied by the conflict detection response message contains index information of time-frequency resource blocks occupied and/or indication information of time domain resources occupied.

Alternatively, the indication information of the time domain resources refers to indication information of frames and/or subframes.

Moreover, the information of the number of times of needing to repeatedly send the conflict detection response message can be sent in the downlink control information or system information; the value of the number of times can be configured with standards or determined according to the random access information selected by the UE1.

In addition, the downlink control information or system information also can include a HARQ mechanism enable identifier of the conflict detection response message;

when the value of the HARQ mechanism enable identifier of the random access response message shows that a HARQ mechanism of the random access response message is enabled, the conflict detection response message is transmitted with the HARQ mechanism; and when the value of the HARQ mechanism enable identifier of the random access response message shows that a HARQ mechanism of the random access response message is dis-enabled, a transmission mode used for the conflict detection response message is configured with standards.

(5) After receiving the conflict detection response message sent by the eNodeB, the UE1 replies an answering message to the eNodeB; and the eNodeB confirms whether the UE1 successfully receives the conflict detection response message according to the message.

Wherein, a resource location occupied by the UE1 sending the answering message of the conflict detection response message is obtained according to at least one of the following:

determined according to location indication information of resources of the answering message of the conflict detection response message allocated by the eNodeB to the current UE1 carried in the received conflict detection response message;

determined according to the random access information selected by the UE1;

determined according to the location information of the resources occupied by the received conflict detection response message.

Certainly, besides the calculation method for the RA-RNTI described in the example, the calculation method for the RA-RNTI also can be:

RA-RNTI=$f$(StartFrame$Idx$,StartSubframe$Idx$, offset$_{RA\text{-}RNTI}$)=StartFrame$Idx$×α+StartSubframe$Idx$×β+offset$_{RA\text{-}RNTI}$ or RA-RNTI=$f$(StartFrame$Idx$,StartSubframe$Idx$, offset$_{RA\text{-}RNTI}$)=$\lfloor$StartFrame$Idx$×α+StartSubframe$Idx$×β$\rfloor$+offset$_{RA\text{-}RNTI}$ or RA-RNTI=$f$(StartFrame$Idx$,StartSubframe$Idx$, offset$_{RA\text{-}RNTI}$)=$\lceil$StartFrame$Idx$×α+StartSubframe$Idx$×β$\rceil$+offset$_{RA\text{-}RNTI}$ wherein: $\lfloor\ \rfloor$ represents a round-down operation; $\lceil\ \rceil$ represents a round-up operation; and implications of other parameters are similar to the above descriptions, which will not be repeated here.

APPLICATION EXAMPLE 5

In a wireless communication system, a random access method includes the following steps.

(1) A terminal UE1 in the wireless communication system sends a random access signaling in a random access channel, and the random access signaling can be constituted in the following ways.

(a) Firstly, the UE1 determines the number of times of needing to repeatedly send a random access sequence, which includes:

the UE1 measuring the signal quality information of a downlink reference signal sent by the eNodeB, and comparing the signal quality information of the downlink reference signal with a preset threshold value, and determining the number of times of needing to repeatedly send the random access sequence;

wherein, the above downlink reference signal can be at least one of the following:

a cell-specific reference signal, a primary synchronization signal and a secondary synchronization signal;

the signal quality information can be at least one of the following:

reference signal received power, a reference signal received quality, a received signal strength indicator, a path loss value between the UE1 and the eNodeB, and a signal to noise ratio of the downlink reference signal;

the predetermined threshold value can be configured with standards by default and stored in the UE1, or it can be configured with standards by default and stored in the eNodeB, and then be sent by the eNodeB to the UE1;

wherein, the predetermined threshold value includes one or more values;

wherein, the eNodeB can be one of the following:

a Macrocell, a Microcell, a Picocell, a Femtocell (also called a home eNodeB) and a Smallcell.

In the example, the UE1 determines that the number of times of needing to repeatedly send the random access sequence is Nseq, and then selects one random access sequence from random access sequences supporting Nseq times of time-domain repetition, for example, a random access sequence selected by the UE1 is a Sequence1, and an index of the Sequence1 is a Sequence Index1.

(b) Secondly, the UE1 sends a random access signaling Enhanced Sequence1 in a random access channel; wherein, the constitution of the Enhanced Sequence1 is as shown in FIG. 2 or FIG. 3 or FIG. 4, the type of the constitution of the Enhanced Sequence1 selected by the UE1 is indicated by the type information of the random access sequence, and the type information of the random access sequence is sent by the eNodeB to the UE1. Wherein, T_Sequence1 (see T_Seq1 in the figure) is an expression form of the Sequence1 when the Sequence1 is sent in the time domain; the CP is a cyclic prefix, and it is constituted by a part of data in the T_Sequence1 according to standard configurations.

The resources of the random access channel used by the UE1 include Nsegment resource Segments, each Segment includes Nunit sending Units, a time-domain length of each Unit is Nsubframe subframes, and Nsc subcarriers are occupied in the frequency domain;

In the example, the resource distributed situation of the random access channel used by the UE1 is as shown in FIG. 5, two resource Segments Segment 1 and Segment 2 are included, and the size of each Segment is one Frame. Both the Segment 1 and Segment 2 include three sending units, the time-domain length of each Unit is one subframe, 72 subcarriers are occupied in the frequency domain, and locations of the occupied frequency-domain subcarriers are identical. The distribution of the Units in the Segment 2 is different from the distribution of the Units in the Segment 1 in time domain and frequency domain. The UE1 sends the Enhanced Sequence1 in Unit1~Unit6.

(2) If successfully detecting the Enhanced Sequence1 sent by the UE1, the eNodeB sends a random access response message, and a mode for transmitting the message can be unicast, multicast or broadcast.

Wherein, location information of resources occupied by the random access response message is configured with standards or sent by the eNodeB to the UE1 in downlink control information or system information via a downlink channel; the downlink control information also includes a M-bit CRC, and the CRC is scrambled with a M-bit RA-RNTI, and a scrambling formula is as shown in the following formula:

$$c_k = (b_k + a_k) \bmod 2 \quad k = 0, 1, L, M-1$$

wherein, $b_k$ is the k+1th bit in bits of the CRC; $a_k$ is the k+1th bit in bits of the RA-RNTI; $c_k$ is the k+1th bit generated through the scrambling; and the RA-RNTI can be determined according to the following method:

$$\text{RA-RNTI} = f(\text{SegmentID}, N_{RA\text{-}RNTI}, \text{offset}_{RA\text{-}RNTI}) = \bmod(\text{SegmentID} \times \alpha, N_{RA\text{-}RNTI}) + \text{offset}_{RA\text{-}RNTI}$$

wherein:

f( ) is a functional operation operator;

RA-RNTI=f(SegmentID, $N_{RA\text{-}RNTI}$, offset$_{RA\text{-}RNTI}$) represents that the RA-RNTI is obtained by performing f( ) functional operation on the SegmentID, $N_{RA\text{-}RNTI}$ and offset$_{RA\text{-}RNTI}$;

mod(X, Y) represents a remainder operation of X to Y;

α is an arbitrary real number;

the SegmentID is index information of a start Segment occupied when the UE1 sends the Enhanced Sequence1, and it is the index information of the Segment1 in the example;

$N_{RA\text{-}RNTI}$ is the total number of distributable RA-RNTIs;

offset$_{RA\text{-}RNTI}$ is one offset.

Alternatively, the downlink control information or system information also can include a HARQ mechanism enable identifier of the random access response message;

when the value of the HARQ mechanism enable identifier of the random access response message shows that a HARQ mechanism of the random access response message is enabled, the random access response message is transmitted with the HARQ mechanism; and when the value of the HARQ mechanism enable identifier of the random access response message shows that an HARQ mechanism of the random access response message is disenabled, a transmission mode used for the random access response message is configured with standards.

Moreover, information of the number of times of needing to repeatedly send the random access response message can be sent in the downlink control information or system information, or be configured with standards. The random access response message at least includes a header and a Payload, and the header includes one or more subheaders, as shown in FIG. 6. In addition, the random access response message also can include Padding, as shown in FIG. 7.

In the example, the subheader corresponding to the UE1 is a subheader2, and the index Sequence Index1 of the random access sequence Sequence1 and the time-domain repetition number information Nseq of the Sequence1 are contained in the subheader 2;

the payload at least includes location information of uplink resources allocated to the UE1, a location of the above location information in the Payload is implicitly indicated by the subheader2, that is, a mapping relationship exists between the subheader2 and one time-frequency resource block (it is assumed as a RAR2 in the example) in the Payload, as shown in FIG. 11, and after successfully decoding the subheader2, the UE continues to decode information in the RAR2 corresponding to the subheader2. Wherein, the information in the RAR2 at least includes the location information of the uplink resources allocated to the UE1; and then the UE1 can send a conflict detection message in corresponding uplink resources according to the analyzed location information of the uplink resources allocated.

Moreover, the above location information of the uplink resources contains index information of time-frequency resource blocks occupied by the uplink resources and/or indication information of time domain resources occupied by the uplink resources; and it also can contain the number of times of needing to repeatedly send the conflict detection information; wherein, the indication information of the time domain resources occupied by the uplink resources refers to indication information of frames and/or subframes occupied by the uplink resources;

the indication information of the time domain resources occupied by the uplink resources also can be configured with standards or determined according to the random access information selected by the UE1;

in the example, the random access information selected by the UE1 can contain: the type of the random access sequence selected by the UE1, an index Sequence Index1 of the random access sequence Sequence1 selected by the UE1 and/or a time-domain repetition number Nseq;

the index information of the time-frequency resource blocks occupied by the uplink resources is used for indicating index information of the uplink resources in P (P>=1) time-frequency resource blocks.

It should be noted that the value of P and the size of a time-frequency resource block can be configured with standards or determined according to the random access information selected by the UE1.

(3) The UE1 sends conflict detection information to the eNodeB in the uplink resources indicated by the random access response message. Wherein, the conflict detection information at least includes K (the value of the K is configured with standards) bits of user identification information.

(4) After receiving the conflict detection information sent by the UE1, the eNodeB sends a conflict detection response message in a downlink channel; and a mode for transmitting the message is unicast, multicast or broadcast.

Wherein, location information of resources occupied by the conflict detection response message is sent by the eNodeB to the UE1 through the downlink control information or system information; and the location information of the resources occupied by the conflict detection response message contains index information of time-frequency resource blocks occupied and/or indication information of time domain resources occupied.

Alternatively, the indication information of the time domain resources refers to indication information of frames and/or subframes.

Moreover, information of the number of times of needing to repeatedly send the conflict detection response message can be sent in the downlink control information or system information; the value of the number of times can be configured with standards or determined according to the random access information selected by the UE1.

In addition, the downlink control information or system information also can include a HARQ mechanism enable identifier of the conflict detection response message;

when the value of the HARQ mechanism enable identifier of the random access response message shows that a HARQ mechanism of the random access response message is enabled, the conflict detection response message is transmitted with the HARQ mechanism; and when the value of the HARQ mechanism enable identifier of the random access response message shows that a HARQ mechanism of the random access response message is disenabled, a transmission mode used for the conflict detection response message is configured with standards.

(5) After receiving the conflict detection response message sent by the eNodeB, the UE1 replies an answering message to the eNodeB; and the eNodeB confirms whether the UE1 successfully receives the conflict detection response message according to the message.

Wherein, a resource location of the UE1 sending the answering message of the conflict detection response message is obtained according to at least one of the following:

determined according to location indication information of resources of the answering message of the conflict detection response message allocated by the eNodeB to the current UE1 carried in the received conflict detection response message;

determined according to the random access information selected by the UE1; determined according to the location information of the resources occupied by the received conflict detection response message.

Certainly, besides the calculation method for the RA-RNTI described in the example, the calculation method for the RA-RNTI also can be:

RA-RNTI=$f(SegmentID, offset_{RA\text{-}RNTI})$=$SegmentID \times \alpha + offset_{RA\text{-}RNTI}$ or RA-RNTI=$f(SegmentID, offset_{RA\text{-}RNTI})$=$\lfloor SegmentID \times \alpha \rfloor + offset_{RA\text{-}RNTI}$ or RA-RNTI=$f(SegmentID, offset_{RA\text{-}RNTI})$=$\lceil SegmentID \times \alpha \rceil + offset_{RA\text{-}RNTI}$ wherein, $\lfloor \ \rfloor$ represents a round-down operation; $\lceil \ \rceil$ represents a round-up operation; and implications of other parameters are similar to the above descriptions, which will not be repeated here.

APPLICATION EXAMPLE 6

In a wireless communication system, a random access method includes the following steps.

(1) A terminal UE1 in the wireless communication system sends a random access signaling in a random access channel, and the random access signaling can be constituted in the following ways.

(a) Firstly, the UE1 determines the number of times of needing to repeatedly send a random access sequence, which includes:

the UE1 measuring the signal quality information of a downlink reference signal sent by the eNodeB, and comparing the signal quality information of the downlink reference signal with a preset threshold value, and determining the number of times of needing to repeatedly send the random access sequence;

wherein, the above downlink reference signal can be at least one of the following:

a cell-specific reference signal,
a primary synchronization signal and
a secondary synchronization signal;

the signal quality information can be at least one of the following:

reference signal received power,
a reference signal received quality,
a received signal strength indicator,
a path loss value between the UE1 and the eNodeB, and
a signal to noise ratio of the downlink reference signal;

the predetermined threshold value can be configured with standards by default and stored in the UE1, or the predetermined threshold value is configured with standards by default and stored in the eNodeB, and then is sent by the eNodeB to the UE1;

wherein, the predetermined threshold value includes one or more values;

wherein, the eNodeB can be one of the following:

a Macrocell, a Microcell, a Picocell, a Femtocell (also called a home eNodeB) and a Smallcell.

In the example, the UE1 determines that the number of times of needing to repeatedly send the random access sequence is Nseq, and then selects one random access sequence from random access sequences supporting Nseq times of time-domain repetition, for example, a random access sequence selected by the UE1 is a Sequence1, and an index of the Sequence1 is a Sequence Index1.

(b) Secondly, the UE1 sends a random access signaling Enhanced Sequence1 in a random access channel; wherein, the constitution of the Enhanced Sequence1 is as shown in FIG. 2 or FIG. 3 or FIG. 4. Wherein, T_Sequence1 (see T_Seq1 in the figure) is an expression form of the Sequence1 when the Sequence1 is sent in the time domain; the CP is a cyclic prefix, and it is constituted by a part of data in the T_Sequence1 according to standard configurations. The resources of the random access channel used by the UE1 include Nsegment resource Segments, each Segment includes Nunit sending Units, a time-domain length of each Unit is Nsubframe subframes, and Nsc subcarriers are occupied in the frequency domain;

In the example, the resource distributed situation of the random access channel used by the UE1 is as shown in FIG. 5, two resource Segments Segment 1 and Segment 2 are included, and the size of each Segment is one Frame. Both the Segment 1 and Segment 2 include three sending units, the time-domain length of each Unit is one subframe, 72 subcarriers are occupied in the frequency domain, and locations of the occupied frequency-domain subcarriers are identical. The distribution of the Units in the Segment 2 is different from the distribution of the Units in the Segment 1 in time domain and frequency domain. The UE1 sends the Enhanced Sequence1 in a Unit2, Unit3, Unit5 and Unit6.

(2) If successfully detecting the Enhanced Sequence1 sent by the UE1, the eNodeB sends a random access response message, and a mode for transmitting the message can be unicast, multicast or broadcast.

Wherein, location information of resources occupied by the random access response message is configured with standards or sent by the eNodeB to the UE1 in downlink control information or system information via a downlink channel;

the downlink control information also includes a M-bit CRC, and the CRC is scrambled with a M-bit RA-RNTI, and a scrambling formula is as shown in the following formula:

$$c_k=(b_k+a_k) \bmod 2 \ k=0,1,L,M-1$$

wherein, $b_k$ is the k+1th bit in bits of the CRC; $a_k$ is the k+1th bit in bits of the RA-RNTI; $c_k$ is the k+1th bit generated through the scrambling;

and the RA-RNTI is determined according to the following method:

$$\text{RA-RNTI}=f(\text{SegmentID},\text{FrequencyIdx},N_{RA\text{-}RNTI},\text{offset}_{RA\text{-}RNTI})=\bmod(\text{SegmentID}\times\alpha+\text{FrequencyIdx}\times\beta,N_{RA\text{-}RNTI})+\text{offset}_{RA\text{-}RNTI}$$

wherein:

f( ) is a functional operation operator;

RA-RNTI=f(SegmentID, FrequencyIdx, $N_{RA\text{-}RNTI}$, offset$_{RA\text{-}RNTI}$) represents that the RA-RNTI is obtained by performing f( ) functional operation on the SegmentID, FrequencyIdx, $N_{RA\text{-}RNTI}$ and offset$_{RA\text{-}RNTI}$;

mod(X, Y) represents a remainder operation of X to Y;

α and β are arbitrary real numbers;

the SegmentID is index information of a start Segment occupied when the UE1 sends the Enhanced Sequence1, and it is the index information of the Segment1 in the example;

the FrequencyIdx is index information of frequency domain resources corresponding to a start resource Unit2 occupied when the UE1 sends the Enhanced Sequence1; if the Unit2 occupies multiple subframes, the FrequencyIdx can be index information of frequency resources in the first subframe occupied by the Unit2; or, if the Unit2 occupies multiple subframes, the information indicated by the FrequencyIdx corresponding to which subframes in the Unit2 is configured with standards;

or, the FrequencyIdx is index information of frequency resources corresponding to a start resource Unit1 of the first Segment (i.e. Segment1) occupied when the UE1 sends the Enhanced Sequence1; if the Unit1 occupies multiple subframes, the FrequencyIdx can be index information of frequency resources in the first subframe occupied by the Unit1; or, if the Unit1 occupies multiple subframes, the information indicated by the FrequencyIdx corresponding to which subframes in the Unit1 is configured with standards;

$N_{RA\text{-}RNTI}$ is the total number of distributable RA-RNTIs;

offset$_{RA\text{-}RNTI}$ is one offset.

Alternatively, the downlink control information or system information also can include a HARQ mechanism enable identifier of the random access response message;

when the value of the HARQ mechanism enable identifier of the random access response message shows that a HARQ mechanism of the random access response message is enabled, the random access response message is transmitted with the HARQ mechanism; and when the value of the HARQ mechanism enable identifier of the random access response message shows that a HARQ mechanism of the random access response message is disenabled, a transmission mode used for the random access response message is configured with standards; moreover, information of the number of times of needing to repeatedly send the random access response message can be sent in the downlink control information or system information, or be configured with standards.

The random access response message at least includes a header and a Payload, and the header includes one or more subheaders, as shown in FIG. 6. In addition, the random access response message also can include Padding, as shown in FIG. 7.

In the example, the subheader corresponding to the UE1 is a subheader2, and the index Sequence Index1 of the random access sequence Sequence1 and the time-domain repetition number information Nseq of the Sequence1 are contained in the subheader 2;

the payload at least includes location information of uplink resources allocated to the UE1, and the location information of the above location information in the payload is directly indicated by the subheader2, or is indicated through the downlink control information or system information;

the UE1 can send a conflict detection message in corresponding uplink resources according to an indication;

the above location information of the uplink resources contains index information of time-frequency resource blocks occupied by the uplink resources and/or indication information of time domain resources occupied by the uplink resources, and it also can include the number of times of needing to repeatedly send the conflict detection information; wherein, the indication information of the time domain resources occupied by the uplink resources refers to indication information of frames and/or subframes occupied by the uplink resources;

the indication information of the time domain resources occupied by the uplink resources also can be configured with standards or determined according to the random access information selected by the UE1;

in the example, the random access information selected by the UE1 can contain: the type of the random access sequence selected by the UE1, an index Sequence Index1 of the random access sequence Sequence1 selected by the UE1 and/or a time-domain repetition number Nseq;

the index information of the time-frequency resource blocks occupied by the uplink resources is used for indicating index information of the uplink resources in P (P>=1) time-frequency resource blocks.

It should be noted that the value of P and the size of a time-frequency resource block can be configured with standards or determined according to the random access information selected by the UE1.

(3) The UE1 sends conflict detection information to the eNodeB in the uplink resources indicated by the random access response message. Wherein, the conflict detection information at least includes K (the value of the K is configured with standards) bits of user identification information.

(4) After receiving the conflict detection information sent by the UE1, the eNodeB sends a conflict detection response message in a downlink channel; and a mode for transmitting the message is unicast, multicast or broadcast.

Wherein, location information of resources occupied by the conflict detection response message is sent by the eNodeB to the UE1 through the downlink control information or system information;

the location information of the resources occupied by the conflict detection response message contains index information of time-frequency resource blocks occupied and/or indication information of time domain resources occupied.

Alternatively, the indication information of the time domain resources refers to indication information of frames and/or subframes.

Moreover, information of the number of times of needing to repeatedly send the conflict detection response message can be sent in the downlink control information or system information; the value of the number of times can be configured with standards or determined according to the random access information selected by the UE1.

In addition, the downlink control information or system information also can include a HARQ mechanism enable identifier of the conflict detection response message;

when the value of the HARQ mechanism enable identifier of the random access response message shows that a HARQ mechanism of the random access response message is enabled, the conflict detection response message is transmitted with the HARQ mechanism; and when the value of the HARQ mechanism enable identifier of the random access response message shows that a HARQ mechanism of the random access response message is disenabled, a transmission mode used for the conflict detection response message is configured with standards.

(5) After receiving the conflict detection response message sent by the eNodeB, the UE1 replies an answering message to the eNodeB; and the eNodeB confirms whether the UE1 successfully receives the conflict detection response message according to the message.

Wherein, a resource location occupied by the UE1 sending the answering message of the conflict detection response message is obtained according to at least one of the following:

determined according to location indication information of resources of the answering message of the conflict detection response message allocated by the eNodeB to the current UE1 carried in the received conflict detection response message;

determined according to the random access information selected by the UE1;

determined according to the location information of the resources occupied by the received conflict detection response message.

Certainly, besides the calculation method for the RA-RNTI described in the example, the calculation method for the RA-RNTI also can be:

$$RA\text{-}RNTI = f(SegmentID, FrequencyIdx, \text{offset}_{RA\text{-}RNTI}) = SegmentID \times \alpha + FrequencyIdx \times \beta + \text{offset}_{RA\text{-}RNTI}$$

or $$RA\text{-}RNTI = f(SegmentID, FrequencyIdx, \text{offset}_{RA\text{-}RNTI}) = \lfloor SegmentID \times \alpha + FrequencyIdx \times \beta \rfloor + \text{offset}_{RA\text{-}RNTI}$$

or $$RA\text{-}RNTI = f(SegmentID, FrequencyIdx, \text{offset}_{RA\text{-}RNTI}) = \lceil SegmentID \times \alpha + FrequencyIdx \times \beta \rceil + \text{offset}_{RA\text{-}RNTI}$$

wherein,

⌊ ⌋ represents a round-down operation; ⌈ ⌉ represents a round-up operation; and implications of other parameters are similar to the above descriptions, which will not be repeated here.

APPLICATION EXAMPLE 7

In a wireless communication system, a random access method includes the following steps.

(1) A terminal UE1 in the wireless communication system sends a random access signaling in a random access channel, and the random access signaling can be constituted in the following ways.

(a) Firstly, the UE1 determines the number of times of needing to repeatedly send a random access sequence, which includes:

the UE1 measuring the signal quality information of a downlink reference signal sent by the eNodeB, and comparing the signal quality information of the downlink reference signal with a preset threshold value, and determining the number of times of needing to repeatedly send the random access sequence;

wherein, the above downlink reference signal can be at least one of the following:

a cell-specific reference signal, a primary synchronization signal and a secondary synchronization signal;

the signal quality information can be at least one of the following:

reference signal received power, a reference signal received quality, a received signal strength indicator, a path loss value between the UE1 and the eNodeB, and a signal to noise ratio of the downlink reference signal;

the predetermined threshold value can be configured with standards by default and stored in the UE1, or it can be configured with standards by default and stored in the eNodeB, and then be sent by the eNodeB to the UE1;

wherein, the predetermined threshold value includes one or more values;

wherein, the eNodeB can be one of the following:

a Macrocell, a Microcell, a Picocell, a Femtocell (also called a home eNodeB) and a Smallcell.

In the example, the UE1 determines that the number of times of needing to repeatedly send the random access sequence is Nseq, and then selects one random access sequence from random access sequences supporting Nseq times of time-domain repetition, for example, a random access sequence selected by the UE1 is a Sequence1, and an index of the Sequence1 is a Sequence Index1.

(b) Secondly, the UE1 sends a random access signaling Enhanced Sequence1 in a random access channel; wherein, the constitution of the Enhanced Sequence1 is as shown in FIG. 2 or FIG. 3 or FIG. 4. Wherein, T_Sequence1 (see T_Seq1 in the figure) is an expression form of the Sequence1 when the Sequence1 is sent in the time domain; the CP is a cyclic prefix, and it is constituted by a part of data in the T_Sequence1 according to standard configurations.

The resources of the random access channel used by the UE1 include Nsegment resource Segments, each Segment includes Nunit sending Units, a time-domain length of each Unit is Nsubframe subframes, and Nsc subcarriers are occupied in the frequency domain;

In the example, the resource distributed situation of the random access channel used by the UE1 is as shown in FIG. 5, two resource Segments Segment 1 and Segment 2 are included, and the size of each Segment is one Frame. Both the Segment 1 and Segment 2 include three sending Units, the time-domain length of each Unit is one subframe, 72 subcarriers are occupied in the frequency domain, and locations of the occupied frequency-domain subcarriers are identical. The distribution of the Units in the Segment 2 is different from the distribution of the Units in the Segment 1 in time domain and frequency domain. The UE1 sends the Enhanced Sequence1 in a Unit2, Unit3, Unit5 and Unit6.

(2) If successfully detecting the Enhanced Sequence1 sent by the UE1, the eNodeB sends a random access response message, and a mode for transmitting the message can be unicast, multicast or broadcast.

Wherein, location information of resources occupied by the random access response message is configured with standards or sent by the eNodeB to the UE1 in downlink control information or system information via a downlink channel;

the downlink control information also includes a M-bit CRC, and the CRC is scrambled with a M-bit RA-RNTI, and a scrambling formula is as shown in the following formula:

$$c_k=(b_k+a_k) \bmod 2 \ k=0,1,L,M-1$$

wherein, $b_k$ is the k+1th bit in bits of the CRC; $a_k$ is the k+1th bit in bits of the RA-RNTI; $c_k$ is the k+1th bit generated through the scrambling;

the RA-RNTI can be determined according to the following method:

$$\text{RA-RNTI}=f(\text{Sequence}Idx, \text{Repetition}, N_{RA\text{-}RNTI}, \text{offset}_{RA\text{-}RNTI})=\bmod(\text{Sequence}Idx \times \alpha + \text{Repetition} \times \beta, N_{RA\text{-}RNTI})+\text{offset}_{RA\text{-}RNTI}$$

wherein:

f( ) is a functional operation operator;

RA-RNTI=f(SequenceIdx, Repetition, $N_{RA\text{-}RNTI}$, offset$_{RA\text{-}RNTI}$) represents that the RA-RNTI is obtained by performing f( ) functional operation on the SequenceIdx, Repetition, $N_{RA\text{-}RNTI}$ and offset$_{RA\text{-}RNTI}$;

mod(X, Y) represents a remainder operation of X to Y;

α and β are arbitrary real numbers;

the SequenceIdx is an index of the random access sequence Sequence1 selected by the UE1, and it is the Sequence Index1 in the example;

the Repetition is the time-domain repetition numbers of the random access sequence Sequence1 selected by the UE1, and it is the Nseq in the example;

$N_{RA\text{-}RNTI}$ is the total number of distributable RA-RNTIs;

offset$_{RA\text{-}RNTI}$ is one offset.

Alternatively, the downlink control information or system information also can include a HARQ mechanism enable identifier of the random access response message;

when the value of the HARQ mechanism enable identifier of the random access response message shows that a HARQ mechanism of the random access response message is enabled, the random access response message is transmitted with the HARQ mechanism; and when the value of the HARQ mechanism enable identifier of the random access response message shows that a HARQ mechanism of the random access response message is disenabled, a transmission mode used for the random access response message is configured with standards; moreover, information of the number of times of needing to repeatedly send the random access response message can be sent in the downlink control information or system information, or be configured with standards.

The random access response message at least includes a header and a Payload, and the header includes one or more subheaders, as shown in FIG. 6. In addition, the random access response message also can include Padding, as shown in FIG. 7.

In the example, the subheader corresponding to the UE1 is a subheader2, and the index Sequence Index1 of the random access sequence Sequence1 and the time-domain repetition number information Nseq of the Sequence1 are contained in the subheader 2; and the subheader2 is scrambled with an RA-RNTI, and a scrambling mode is:

$$f_i=(d_i+e_i) \bmod 2 \ i=0,1,L,Q-1$$

wherein, $d_i$ is the i+1th bit in information bits of a subheader2 that is not scrambled, $e_i$ is the i+1th bit in Q information bits in the RA-RNTI, and a selection rule thereof is configured with standards; $f_i$ is the i+1th bit in bits of a subheader2 that is scrambled.

Moreover, information of the number of times of needing to repeatedly send the random access response message can be sent in the downlink control information or system information, or be configured with standards.

The payload at least includes location information of uplink resources allocated to the UE1, and the location of the above location information of the uplink resources in the Payload is implicitly indicated by the subheader2, that is, a mapping relationship exists between the subheader2 and one time-frequency resource block (RAR2) in the Payload, as shown in FIG. 11, and after successfully decoding the subheader2, the UE continues to decode information in the RAR2 corresponding to the subheader2. Wherein, the information in the RAR2 at least includes the location information of the uplink resources allocated to the UE1; and then the UE1 can send a conflict detection message in corresponding uplink resources according to the analyzed location information of the uplink resources allocated.

Moreover, the above location information of the uplink resources contains index information of time-frequency resource blocks occupied by the uplink resources and/or indication information of time domain resources occupied by the uplink resources, and it also can include the number of times of needing to repeatedly send the conflict detection information; wherein, the indication information of the time domain resources occupied by the uplink resources refers to indication information of frames and/or subframes occupied by the uplink resources;

the indication information of the time domain resources occupied by the uplink resources also can be configured with standards or determined according to the random access information selected by the UE1;

in the example, the random access information selected by the UE1 can contain: the type of the random access sequence selected by the UE1, an index Sequence Index1 of the random access sequence Sequence1 selected by the UE1 and/or a time-domain repetition number Nseq;

the index information of the time-frequency resource blocks occupied by the uplink resources is used for indicating index information of the uplink resources in P (P>=1) time-frequency resource blocks.

It should be noted that the value of P and the size of a time-frequency resource block can be configured with standards or determined according to the random access information selected by the UE1.

(3) The UE1 sends conflict detection information to the eNodeB in the uplink resources indicated by the random access response message. Wherein, the conflict detection information at least includes K (the value of the K is configured with standards) bits of user identification information.

(4) After receiving the conflict detection information sent by the UE1, the eNodeB sends a conflict detection response message in a downlink channel; and a mode for transmitting the message is unicast, multicast or broadcast.

Wherein, location information of resources occupied by the conflict detection response message is sent by the eNodeB to the UE1 through the downlink control information or system information;

the location information of the resources occupied by the conflict detection response message contains index information of time-frequency resource blocks occupied and/or indication information of time domain resources occupied.

Alternatively, the indication information of the time domain resources refers to indication information of frames and/or subframes.

Moreover, information of the number of times of needing to repeatedly send the conflict detection response message can be sent in the downlink control information or system information; the value of the number of times can be configured with standards or determined according to the random access information selected by the UE1.

In addition, the downlink control information or system information also can include a HARQ mechanism enable identifier of the conflict detection response message;

when the value of the HARQ mechanism enable identifier of the random access response message shows that a HARQ mechanism of the random access response message is enabled, the conflict detection response message is transmitted with the HARQ mechanism; and when the value of the HARQ mechanism enable identifier of the random access response message shows that an HARQ mechanism of the random access response message is disenabled, a transmission mode used for the conflict detection response message is configured with standards.

(5) After receiving the conflict detection response message sent by the eNodeB, the UE1 replies an answering message to the eNodeB; and the eNodeB confirms whether the UE1 successfully receives the conflict detection response message according to the message.

Wherein, a resource location occupied by the UE1 sending the answering message of the conflict detection response message is obtained according to at least one of the following:

determined according to location indication information of resources of the answering message of the conflict detection response message allocated by the eNodeB to the current UE1 carried in the received conflict detection response message;

determined according to the random access information selected by the UE1; determined according to the location information of the resources occupied by the received conflict detection response message.

Certainly, besides the calculation method for the RA-RNTI described in the example, the calculation method for the RA-RNTI also can be:

$$RA\text{-}RNTI = f(SegmentIdx, Repetition, offset_{RA\text{-}RNTI}) = SegmentIdx \times \alpha + Repetition \times \beta + offset_{RA\text{-}RNTI}$$

or $$RA\text{-}RNTI = f(SegmentIdx, Repetition, offset_{RA\text{-}RNTI}) = \lfloor SegmentIdx \times \alpha + Repetition \times \beta \rfloor + offset_{RA\text{-}RNTI}$$

or $$RA\text{-}RNTI = f(SegmentIdx, Repetition, offset_{RA\text{-}RNTI}) = \lceil SegmentIdx \times \alpha + Repetition \times \beta \rceil + offset_{RA\text{-}RNTI}$$

wherein, $\lfloor \ \rfloor$ represents a round-down operation; $\lceil \ \rceil$ represents a round-up operation; and implications of other parameters are similar to the above descriptions, which will not be repeated here.

APPLICATION EXAMPLE 8

In a wireless communication system, a random access method includes the following steps.

(1) A terminal UE1 in the wireless communication system sends a random access signaling in a random access channel, and the random access signaling can be constituted in the following ways.

(a) Firstly, the UE1 determines the number of times of needing to repeatedly send a random access sequence, which includes:

the UE1 measuring the signal quality information of a downlink reference signal sent by the eNodeB, and comparing the signal quality information of the downlink reference signal with a preset threshold value, and determining the number of times of needing to repeatedly send the random access sequence;

wherein, the above downlink reference signal can be at least one of the following:

a cell-specific reference signal, a primary synchronization signal and a secondary synchronization signal;

the signal quality information can be at least one of the following:

reference signal received power, a reference signal received quality, a received signal strength indicator, a path loss value between the UE1 and the eNodeB, and a signal to noise ratio of the downlink reference signal;

the predetermined threshold value can be configured with standards by default and stored in the UE1, or it can be configured with standards by default and stored in the eNodeB, and then be sent by the eNodeB to the UE1;

wherein, the predetermined threshold value includes one or more values;

wherein, the eNodeB can be one of the following:

a Macrocell, a Microcell, a Picocell, a Femtocell (also called a home eNodeB) and a Smallcell.

In the example, the scheme of the UE1 determining the number of times of needing to repeatedly send the random access sequence is described as follows.

For example, Th-A, Th-B, Th-C and Th-D are 4 predetermined threshold values, and Th-A<Th-B<Th-C<Th-D is satisfied, which respectively corresponds to repeatedly sending the random access sequence for A times, B times, C times and D times; wherein, Th-A, Th-B, Th-C, Th-D, A, B, C and D are all positive integers.

when the UE measures that the signal quality information Q of the downlink reference signal sent by the eNodeB satisfies Q<Th-A, the random access sequence selected by the UE is required to be sent once;

when the UE measures that the signal quality information Q of the downlink reference signal sent by the eNodeB satisfies Th-A≤Q<Th-B, the random access sequence selected by the UE is required to be sent for A times;

when the UE measures that the signal quality information Q of the downlink reference signal sent by the eNodeB satisfies Th-B≤Q<Th-C, the random access sequence selected by the UE is required to be sent for B times;

when the UE measures that the signal quality information Q of the downlink reference signal sent by the eNodeB satisfies Th-C≤Q<Th-D, the random access sequence selected by the UE is required to be sent for C times;

when the UE measures that the signal quality information Q of the downlink reference signal sent by the eNodeB satisfies Q≥Th-D, the random access sequence selected by the UE is required to be sent for D times;

in the example, it is assumed that the UE1 determines that the number of times of needing to repeatedly send the random access sequence is C times according to the above scheme, and it is assumed that Nseq=C, the UE1 selects one random access sequence from random access sequences supporting Nseq times of time-domain repetition, for example, a random access sequence selected by the UE1 is a Sequence1, and an index of the Sequence1 is a Sequence Index1.

(b) Secondly, the UE1 sends a random access signaling Enhanced Sequence1 in a random access channel; wherein, the constitution of the Enhanced Sequence1 is as shown in FIG. 2 or FIG. 3 or FIG. 4. Wherein, T_Sequence1 (see T_Seq1 in the figure) is an expression form of the Sequence1 when the Sequence1 is sent in the time domain; the CP is a cyclic prefix, and it is constituted by a part of data in the T_Sequence1 according to standard configurations.

The resources occupied by the random access channel used by the UE1 include Nsegment resource Segments, each Segment includes Nunit sending Units, a time-domain length of each Unit is Nsubframe subframes, and Nsc subcarriers are occupied in the frequency domain;

in the example, the resource distribution situation of the random access channel used by the UE1 is as shown in FIG. 5, two resource Segments Segment 1 and Segment 2 are included, and the size of each Segment is one Frame. Both the Segment 1 and Segment 2 include three sending units, the time-domain length of each Unit is one subframe, 72 subcarriers are occupied in the frequency domain, and locations of the occupied frequency-domain subcarriers are identical. The distribution of the Units in the Segment 2 is the same as the distribution of the Units in the Segment 1.

The UE1 sends the Enhanced Sequence1 in Unit1~Unit6.

(2) If successfully detecting the Enhanced Sequence1 sent by the UE1, the eNodeB sends a random access response message, and a mode for transmitting the message can be unicast, multicast or broadcast.

Wherein, location information of resources occupied by the random access response message is configured with standards or sent by the eNodeB to the UE1 in downlink control information or system information via a downlink channel;

the number of times of needing to repeatedly send the random access response message can be determined according to the number of times of needing to repeatedly send the random access sequence sent by the UE1.

For example, in the example, after successfully detecting the Enhanced Sequence1 sent by the UE1, the eNodeB knows that a random access sequence Sequence1 (an index thereof is a Sequence Index1) is repeatedly sent for Nseq times, thus the eNodeB determines that the number of times of needing to repeatedly send the random access response message is NRAR according to a preset rule. The preset rule can be that:

a mapping exists between the Nseq and the NRAR. The mapping rule is configured with standards or sent by the eNodeB to the UE1 in advance, and the eNodeB can determine that the number of times of needing to repeatedly send the random access response message is NRAR according to the Nseq.

Moreover, the downlink control information also includes a M-bit CRC, and the CRC is scrambled with a M-bit RA-RNTI, and a scrambling formula is as shown in the following formula:

$$c_k = (b_k + a_k) \bmod 2 \ k=0,1,L,M-1$$

wherein, $b_k$ is the k+1th bit in bits of the CRC; $a_k$ is the k+1th bit in bits of the RA-RNTI; $c_k$ is the k+1th bit generated through the scrambling;

the RA-RNTI can be determined according to the following method:

$$\text{RA-RNTI} = f(\text{StartFrame}Idx, \text{StartSubframe}Idx, N_{RA\text{-}RNTI}, \text{offset}_{RA\text{-}RNTI}) = \bmod(\text{StartFrame}Idx \times \alpha + \text{StartSubframe}Idx \times \beta, N_{RA\text{-}RNTI}) + \text{offset}_{RA\text{-}RNTI}$$

wherein:

f( ) is a functional operation operator;

RA-RNTI=f(StartFrameIdx, StartSubframeIdx, $N_{RA\text{-}RNTI}$, $\text{offset}_{RA\text{-}RNTI}$) represents that the RA-RNTI is obtained by performing f( ) functional operation on the StartFrameIdx, StartSubframeIdx, $N_{RA\text{-}RNTI}$ and $\text{offset}_{RA\text{-}RNTI}$;

mod(X, Y) represents a remainder operation of X to Y;

$\alpha$ and $\beta$ are arbitrary real numbers;

the StartFrameIdx and StartSubframeIdx are respectively index information of frames and subframes corresponding to a start resource Unit1 occupied when the UE1 sends the random access signaling Enhanced Sequence1; if the Unit1 occupies multiple subframes, the StartFrameIdx can be index information of a frame in which the first subframe occupied by the Unit1 is located, and the StartSubframeIdx can be index information of the first subframe occupied by the Unit1; or, if the Unit1 occupies multiple subframes, the information indicated by the StartFrameIdx and StartSubframeIdx corresponding to which subframes in the Unit1 is configured with standards;

$N_{RA\text{-}RNTI}$ is the total number of distributable RA-RNTIs;

$\text{offset}_{RA\text{-}RNTI}$ is one offset.

In the example, it is assumed that $\alpha=10$ and $\beta=1$; values of the $N_{RA\text{-}RNTI}$ and $\text{offset}_{RA\text{-}RNTI}$ are configured with standards by default and stored in the UE1, or they are configured by the eNodeB and informed to the UE1.

Alternatively, the downlink control information or system information also can include a HARQ mechanism enable identifier of the random access response message;

when the value of the HARQ mechanism enable identifier of the random access response message shows that a HARQ mechanism of the random access response message is enabled, the random access response message is transmitted with the HARQ mechanism; and when the value of the HARQ mechanism enable identifier of the random access response message shows that a HARQ mechanism of the random access response message is disenabled, a transmission mode used for the random access response message is configured with standards; the random access response message at least includes a header and a Payload, and the header includes one or more subheaders, as shown in FIG. 6. In addition, the random access response message also can include Padding, as shown in FIG. 7.

In the example, the subheader corresponding to the UE1 is a subheader2, and the index Sequence Index1 of the random access sequence Sequence1 and the time-domain repetition number information Nseq of the Sequence1 are contained in the subheader 2; and the subheader2 is scrambled with a RA-RNTI, and a scrambling mode is:

$$f_i = (d_i + e_i) \bmod 2 \ i=0,1,L,Q-1$$

wherein, $d_i$ is the i+1th bit in information bits of a subheader2 that is not scrambled, $e_i$ is the i+1th bit in Q information bits in the RA-RNTI, and a selection rule thereof is configured with standards; $f_i$ is the i+1th bit in bits of a subheader2 that is scrambled.

The payload at least includes location information of uplink resources allocated to the UE1, and the location information of the above location information of the uplink resources in the payload is directly indicated by the subheader2, or is indicated through the downlink control information or system information; the UE1 can send a conflict detection message in corresponding uplink resources according to an indication.

Moreover, the above location information of the uplink resources contains index information of time-frequency resource blocks occupied by the uplink resources and/or indication information of time domain resources occupied by the uplink resources, wherein, the indication information of the time domain resources occupied by the uplink resources refers to indication information of frames and/or subframes occupied by the uplink resources;

the number of times of needing to repeatedly send the conflict detection message can be determined by the number of times of needing to repeatedly send the random access sequence selected by the UE1, and an implementation scheme is that:

in the example, it is assumed that the random access sequence selected by the UE1 is a Sequence1, an index is a Sequence Index1 and the number of time-domain repetitions is Nseq. It is assumed that NC is the number of times of needing to repeatedly send the conflict detection message, and a mapping exists between the Nseq and the NC, and the mapping rule is configured with standards or sent by the eNodeB to the UE1 in advance, and the eNodeB can determine that the number of times of needing to repeatedly send the conflict detection information is NC according to the Nseq;

the index information of the time-frequency resource blocks occupied by the uplink resources is used for indicating index information of the uplink resources in P (P>=1) time-frequency resource blocks.

It should be noted that the value of P and the size of a time-frequency resource block can be configured with standards or determined according to the random access information selected by the UE1;

in the example, the random access information selected by the UE1 can contain: the type of the random access sequence selected by the UE1, an index Sequence Index1 of the random access sequence Sequence1 selected by the UE1 and/or a time-domain repetition number Nseq.

(3) The UE1 sends a conflict detection message to the eNodeB. Wherein, the conflict detection information at least includes K (the value of the K is configured with standards) bits of user identification information.

(4) After receiving the conflict detection information sent by the UE1, the eNodeB sends a conflict detection response message in a downlink channel; and a mode for transmitting the message is unicast, multicast or broadcast.

Wherein, location information of resources occupied by the conflict detection response message is sent by the eNodeB to the UE1 through the downlink control information or system information; and the location information of the resources occupied by the conflict detection response message contains index information of time-frequency resource blocks occupied and/or indication information of time domain resources occupied.

Alternatively, the indication information of the time domain resources refers to indication information of frames and/or subframes;

Moreover, the information of the number of times of needing to repeatedly send the conflict detection response message can be determined by the number of times of needing to repeatedly send the random access sequence selected by the UE1, and an implementation scheme is that:

in the example, it is assumed that the random access sequence selected by the UE1 is a Sequence1, an index is a Sequence Index1 and the number of time-domain repetitions is Nseq. It is assumed that NCR is the information of the number of times of needing to repeatedly send the conflict detection response message, a mapping exists between the Nseq and the NCR, the mapping rule is configured with standards or sent by the eNodeB to the UE1 in advance, and the eNodeB can determine that the number of times of needing to repeatedly send the conflict detection response message is NCR according to the Nseq.

Alternatively, the downlink control information or system information also can include a HARQ mechanism enable identifier of the conflict detection response message;

when the value of the HARQ mechanism enable identifier of the random access response message shows that a HARQ mechanism of the random access response message is enabled, the conflict detection response message is transmitted with the HARQ mechanism; and when the value of the HARQ mechanism enable identifier of the random access response message shows that a HARQ mechanism of the random access response message is disenabled, a transmission mode used for the conflict detection response message is configured with standards.

(5) After receiving the conflict detection response message sent by the eNodeB, the UE1 replies an answering message to the eNodeB; and the eNodeB confirms whether the UE1 successfully receives the conflict detection response message according to the message.

Wherein, a resource location of the UE1 sending the answering message of the conflict detection response message is determined by at least one of the following:

determined according to containing location indication information of resources of the answering message of the conflict detection response message allocated by the eNodeB to the UE1 included in the above conflict detection response message;

determined according to the random access information selected by the UE1;

determined according to the location information of the resources occupied by the conflict detection response message.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The embodiment of the present invention is not limited to any combination of hardware and software in a specific form.

The above description is only the preferred embodiments of the present invention, which is not used to limit the protection scope of the present document. According to the summary of the present document, it can still have other various embodiments, the skilled familiar to the art can make various corresponding changes and transformations according to the present document without departing from the spirit and essence of the present document. All the modifications, equivalent substitutions, and improvements, etc. made within the spirit and principle of the present document shall fall into the protection scope of the present document.

INDUSTRIAL APPLICABILITY

In the embodiments of the present invention, it enables the MTC UE to normally access the system, and decreases a random access collision probability, and reduces access delay.

What is claimed is:

1. A random access method, comprising:
a second node sending a random access signaling to a first node; and
the first node replying a random access response message to the second node, wherein random access response information of the second node is carried in the random access response message,
wherein:
the random access signaling is generated by the second node in accordance with a preset rule according to selected random access information;
wherein, the random access information comprises at least one of the following:
a type of a random access sequence selected by the second node;
index information of a random access sequence selected by the second node; and
information of number of times of needing to repeatedly send the random access sequence,
wherein:
the second node determines the number of times of needing to repeatedly send the random access sequence, which comprises:
the second node measuring a signal quality of a downlink reference signal sent by the first node, and comparing the signal quality of the downlink reference signal with a preset threshold value, and determining the number of times of needing to repeatedly send the random access sequence,
or,
the second node determines the number of times of needing to repeatedly send the random access sequence, which comprises:
the second node measuring a signal quality of a downlink reference signal sent by the first node, and comparing the signal quality of the downlink reference signal with a preset threshold value, and determining whether the random access sequence is required to be repeatedly sent.

2. The method according to claim 1, wherein:
the random access response information comprises location information of uplink resources allocated by the first node to the second node.

3. The method according to claim 2, further comprising:
after receiving the random access response message, according to the location information of the uplink resources allocated by the first node to the second node, the second node sending a conflict detection message in corresponding uplink resources.

4. The method according to claim 3, further comprising:
after receiving the conflict detection message sent by the second node, the first node sending a conflict detection response message to the second node.

5. The method according to claim 3, further comprising:
the first node sending location information of resources occupied by the conflict detection response message to the second node through downlink control information or system information, wherein the location information of the resources is used for instructing the second node to receive the conflict detection response message in corresponding resource locations.

6. The method according to claim 3, wherein:
the location information of the resources occupied by the conflict detection response message comprises index information of time-frequency resource blocks occupied and/or indication information of time domain resources occupied.

7. The method according to claim 3, wherein:
information of number of times of needing to repeatedly send the conflict detection response message is configured with standards or determined according to random access information selected by the second node, or is sent through the downlink control information or system information;
wherein, the random access information selected by the second node comprises: a type of a random access sequence selected by the second node, information of the number of times of needing to repeatedly send the random access sequence determined by the second node and/or index information of a random access sequence selected by the second node.

8. The method according to claim 3, further comprising:
after receiving the conflict detection response message, the second node replying an answering message of the conflict detection response message to the first node, wherein the answering message is used for confirming whether the second node successfully receives the conflict detection response message.

9. The method according to claim 2, wherein:
the location information of the uplink resources contains index information of time-frequency resource blocks occupied by the uplink resources and/or indication information of time domain resources occupied by the uplink resources.

10. The method according to claim 9, wherein:
the location information of the uplink resources is configured with standards or determined according to random access information selected by the second node;
wherein, the random access information selected by the second node comprises: the type of a random access sequence selected by the second node, information of the number of times of needing to repeatedly send the random access sequence determined by the second node and/or index information of a random access sequence selected by the second node;

or the index information of the time-frequency resource blocks occupied by the uplink resources is used for indicating index information of the uplink resources in P time-frequency resource blocks; wherein, P is a positive integer; the value of the P, the size of a time-frequency resource block and location distribution are configured with standards or determined according to random access information selected by the second node;

wherein, the random access information selected by the second node comprises: the type of a random access sequence selected by the second node, information of the number of times of needing to repeatedly send the random access sequence determined by the second node and/or index information of a random access sequence selected by the second node;

or the location information of the uplink resources further comprises information of the number of times of needing to repeatedly send conflict detection information.

11. The method according to claim 1, wherein:
the preset threshold value comprises at least one value;
wherein, a one-to-one mapping relationship exists between each value and the number of times of needing to repeatedly send one random access sequence;
or
the preset threshold value is configured with standards by default and stored in the second node; or the preset threshold value is configured with standards by default and stored in the first node, and is sent by the first node to the second node;
or
the downlink reference signal is at least one of the following: a cell-specific reference signal, a primary synchronization signal and a secondary synchronization signal;
or
information of the signal quality is at least one of the following: reference signal received power, a reference signal received quality, a received signal strength indicator, a path loss value between the second node and the first node, and a signal to noise ratio of the downlink reference signal.

12. The method according to claim 1, wherein:
if the second node determines that the random access sequence is required to be repeatedly sent, the number of times of needing to repeatedly send the random access sequence is configured by the second node or configured with standards.

13. The method according to claim 1, wherein:
the random access response message comprises a header and a payload, and the header comprises at least one subheader;
wherein, index information of a random access sequence selected by the second node and/or information of the number of times of repeatedly sending a random access sequence selected by the second node is sent in subheaders.

14. The method according to claim 13, wherein:
in at least parts of subheaders, there is a one-to-one correspondence between each subheader and one time-frequency resource block in the payload;
the random access response information containing the location information of the uplink resources allocated by the first node to the second node comprises:
in a time-frequency resource block corresponding to a subheader containing the information of the number of times of repeatedly sending the random access sequence selected by the second node and/or the index information of the random access sequence selected by the second node, containing the location information of the uplink resources allocated by the first node to the second node.

15. The method according to claim 13, wherein:
the random access response information containing the location information of the uplink resources allocated by the first node to the second node comprises:
the location information of the uplink resources allocated by the first node to the second node being in the payload, and a location in the payload being indicated by a subheader containing the index information of the random access sequence selected by the second node and/or the information of the number of times of repeatedly sending the random access sequence selected by the second node.

16. The method according to claim 13, wherein:
the subheader containing the index information of the random access sequence selected by the second node and/or the information of the number of times of repeatedly sending the random access sequence selected by the second node is scrambled with a RA-RNTI, and a scrambling mode is:

$$f_i=(d_i+e_i)\bmod 2\ i=0,1,\ldots$$

wherein, $d_i$ is the i+1th bit in information bits of a subheader that is not scrambled; $e_i$ is the i+1th information bit in the RA-RNTI; $f_i$ is the i+1th bit in the subheader that is scrambled; and M is the number of bits in the subheader that is not scrambled.

17. The method according to claim 16, wherein: more preferably, a selection of M information bits in the RA-RNTI is configured with standards.

18. The method according to claim 1, wherein:
a location of the random access response information of the second node in the random access response message sent by the first node is sent to the second node through downlink control information or system information;
or
the first node is at least one of the following:
a Macrocell, a Microcell, a Picocell, a Femtocell (also called a home eNodeB), a low power node (LPN) and a Relay; and
the second node is at least one terminal or is a terminal group.

19. The method according to claim 1, wherein:
location information of resources occupied by the random access response message is preconfigured with standards and stored in the second node; or,
location information of resources occupied by the random access response message is sent by the first node to the second node through downlink control information or system information.

20. The method according to claim 19, wherein:
the downlink control information further comprises a N-bit cyclic redundancy check (CRC);
wherein, N is a positive integer, and the CRC is scrambled with a N-bit random access radio network temporary identity (RA-RNTI).

21. The method according to claim 20, wherein: the RA-RNTI is determined by at least one of the following:
resource information of a random access channel used by the second node;
random access information sent by the second node to the first node via the random access channel;
wherein, the resource information of the random access channel used by the second node comprises at least one of the following:
resource index information of the random access channel used by the second node;
index information of frames occupied by the random access channel used by the second node;
index information of subframes occupied by the random access channel used by the second node;
index information of frequency domain resources occupied by the random access channel used by the second node; and
index information of physical resource blocks occupied by the random access channel used by the second node.

22. The method according to claim 19, wherein:
the location information of the resources occupied by the random access response message contains index information of time-frequency resource blocks occupied by the random access response message and/or indication information of time domain resources occupied by the random access response message.

23. The method according to claim 1, further comprising:
the first node sending information of the number of times of needing to repeatedly send the random access response message to the second node through downlink control information or system information.

24. A random access system, comprising: a first node and a second node;
the second node is configured to send a random access signaling to the first node; and
the first node is configured to reply a random access response message to the second node, wherein random access response information of the second node is carried in the random access response message,
wherein:
the random access signaling is generated by the second node in accordance with a preset rule according to selected random access information;
wherein, the random access information comprises at least one of the following:
the type of a random access sequence selected by the second node;
index information of a random access sequence selected by the second node; and
information of the number of times of needing to repeatedly send the random access sequence,
wherein, the second node determines the number of times of needing to repeatedly send the random access sequence by means of:
the second node being configured to: measure a signal quality of a downlink reference signal sent by the first node, and compare the signal quality of the downlink reference signal with a preset threshold value, and determine the number of times of needing to repeatedly send the random access sequence,
or,
the second node determines the number of times of needing to repeatedly send the random access sequence by means of:
the second node being configured to: measure a signal quality of a downlink reference signal sent by the first node, and compare the signal quality of the downlink reference signal with a preset threshold value, and determine whether the random access sequence is required to be repeatedly sent.

25. The system according to claim 24, wherein:
the random access response information contains location information of uplink resources allocated by the first node to the second node.

26. The system according to claim 24, wherein:
the random access response message comprises a header and a payload, and the header comprises at least one subheader;
wherein, index information of a random access sequence selected by the second node and/or information of the number of times of repeatedly sending a random access sequence selected by the second node is sent in subheaders.

27. The system according to claim 24, wherein:
location information of resources occupied by the random access response message is preconfigured with standards and stored in the second node; or,
location information of resources occupied by the random access response message is sent by the first node to the second node through downlink control information or system information.

* * * * *